United States Patent [19]

Oosterholt

[11] Patent Number: 4,868,766

[45] Date of Patent: Sep. 19, 1989

[54] METHOD OF GENERATING AND PROCESSING MODELS OF TWO-DIMENSIONAL OR THREE-DIMENSIONAL OBJECTS IN A COMPUTER AND REPRODUCING THE MODELS ON A DISPLAY

[75] Inventor: Ron H. T. Oosterholt, Venlo, Netherlands

[73] Assignee: Oce-Nederland B.V., CC Venlo, Netherlands

[21] Appl. No.: 33,574

[22] Filed: Apr. 1, 1987

[30] Foreign Application Priority Data

Apr. 2, 1986 [NL] Netherlands ............... 8600831

[51] Int. Cl.$^4$ ............................................. G06F 15/20
[52] U.S. Cl. ..................................... 364/522; 364/521; 364/512; 340/750
[58] Field of Search ............... 364/521, 522, 518, 512; 340/747, 750, 723, 731

[56] References Cited

U.S. PATENT DOCUMENTS 4,642,780 2/1987 Thomson ............................ 364/512
4,656,603 4/1987 Dunn ................................. 364/900

OTHER PUBLICATIONS

Aldefeld, B., "On Automatic Recognition of 3D Structures from 2D Representations", Computer Aided Design, vol. 15, No. 2, 3/83.
Kokaira et al., "Interactive Robot Programming with Real Time Graphic Simulation", IECON 84, pp. 35–39.
Takala, T., "A CAD System's Framework", IEEE CG & A, pp. 42–50, 4/85.
Anderson, D. C., "Closing the Gaps: A Workstation–Main Frame Connection", Computers in Mechanical Engineering, May 1986, pp. 16–24.
Schindler, "Intergrated Graphics Enter the Picture to Aid Expert System", Electronic Design, 5/85, pp. 50 and 52.
Thalmann et al., "2388 Computer & Graphics", vol. 6, (1982), pp. 98–100.
Wesley et al., "A Geometric Modeling System for Automated Mechanical Assembly", IBM J. Res. Dev., 1/80, pp. 64–74.

*Primary Examiner*—Gary V. Harkcom
*Assistant Examiner*—Phu K. Nguyen
*Attorney, Agent, or Firm*—Reed Smith Shaw & McClay

[57] ABSTRACT

A method of generating and processing models of two-dimensional and three-dimensional objects in a computer and of reproducing the models on a display is presented. The models are created according to the user's instruction by means of geometric operations such as moving, rotating, enlarging, reducing and/or Boolean operations, such as connecting, forming points of intersection, forming points of differentiation, from elements whose shapes are already determined by data stored in or input into the computer. It is possible for these elements in turn to be constructed from elements of a lower hierarchical level. A menu of commands and a pointer whose position is controllable by the user through an inputting device are shown on the display outside the image of the model so that the user can select specific parts of the model and specific commands by marking the associated place on the display with the pointer. Also, for each element in each hierarchical level, a word and also data concerning the hierarchical relationship between the element and hierarchically higher and lower elements are stored. A structure diagram is reproduced on the display wherein the elements are indicated by a word at a place corresponding to the higher element to which it belongs. The user can mark an element in the structure diagram with the pointer when inputting an operation instruction and the operation is carried out on the indicated element and also on the associated lower-level elements.

9 Claims, 19 Drawing Sheets

METHOD OF GENERATING AND PROCESSING MODELS OF TWO-DIMENSIONAL OR THREE-DIMENSIONAL OBJECTS IN A COMPUTER AND REPRODUCING THE MODELS ON A DISPLAY

FIELD OF THE INVENTION

The present invention relates to a method of generating and processing models of two-dimensional or three-dimensional objects in a computer and reproducing the models on a display. Such a method is particularly useful in the area of computer aided design or CAD.

BACKGROUND OF THE INVENTION

Methods of generating, processing and reproducing models of two-dimensional and three-dimensional objects on a display are typically performed in a computer by means of an appropriate program. The object of these methods is to organize the exchange of information between the computer and the user through the various connected units so that the use of the computer is facilitated. Such methods together with the programs and peripherals required for their performance are known as a user-interface.

One of the objects of a user-interface is to display to the user in a clear and conveniently arranged form an object which is represented as an abstract model in the computer. Another important object is to provide the user with facilities for inputting commands which intentionally generate and modify the models in the computer. The form in which the commands can be input by the user must as far as possible be in keeping with the experience and spatial imagination of the user. The inputting of the commands should also be accomplished as quickly and easily as possible so that the user is not distracted by complex inputting operations, such as occur, for example, when inputting a fairly long text by means of a keyboard or the like.

Known methods of generating and processing models of two-dimensional or three-dimensional objects meet these requirements by generating the abstract representation of the objects in the computer by operations comparable to the handling of the physical objects by man. For example, geometric operations coincide with the movements of physical objects in space and an operation such as connecting two elements corresponds to an action such as pasting two elements together.

The inputting of commands for performing such operations is facilitated by the use of a pointer or cursor which can be moved over the display by means of a suitable inputting device such as a mouse, a joystick, or the like. In this way it is possible for the operands to be shown directly on the display. The operands are the elements with which the command must be executed. The pointer can also be used to indicate the parameters for the geometric commands, such as the distance by which an elements is to be moved over the display or the angle through which the element is to be rotated, by drawing the associated factor or angle on the display by means of the pointer. The pointer can also be used to indicate the type of command to be executed. Also, a menu can be shown on the display which contains the commands from which a choice can be made. Typically the commands are shown by words.

In the known methods, the objects are usually shown on the display in the form of "wire models" wherein the sides of the object are reproduced by lines. A single object is usually represented by a single image involving either a perspective view, a projection, a surface view, a top view or the like, or a cross-section. To increase the surveyability of the image, it is also known to mark concealed lines by changes in color or brightness or to reproduce the different surfaces of the object in different colors or grey levels.

Some examples of known methods are described in "Integrated Graphics Enter the Picture to Aid Expert Systems," *Electronic Design*. Vol. 33, No. 11 (May 16, 1985) at pp. 50–52; "A Multilevel Graphics System Based on Top-Down Methodology," *Computers & Graphics*, Vol. 6, No. 3 (1982) at pp. 97–100; and "A Geometric Modeling System for Automated Mechanical Assembly," *IBM Journal of Research and Development*. Vol. 24, No. 1 (Jan. 1980) at pp. 64–74.

Nevertheless, the surveyability of the image using the known user-interfaces is inadequate for showing two-dimensional images of complicated three-dimensional objects. In the case of objects having a complicated construction or consisting of a large number of different elements, the structure of the object usually cannot be clearly defined by reference to one single two-dimensional image. That means that it is impossible to determine unambiguously which elements are interconnected, which elements are adjacent to one another, or which elements are not directly interconnected. Although it is possible to resolve such problems by viewing the image from a different angle, this requires a relatively considerable amount of computer time and even then, errors in the interpretation of these images cannot be precluded.

The lack of surveyability of the image is particularly disadvantageous if the object has to be changed during further developments of the design. The modifications made by the designer or constructor usually comprise changes in the dimensions of the elements of the object or changes in the position of the individual elements with respect to the other elements. When such modifications are made, the dimensions and/or the positions of adjacent elements and elements connected to the element undergoing modification must be adjusted so that the model of the object always remains consistent. To enable these adjustments to be carried out correctly, the user must know the physical structure of the object. In such cases the user's or designer's spatial imagination is subject to considerable demands.

It is often very difficult or even impossible to indicate exactly with the pointer the individual elements on which certain operations have to be carried out. If the same operation must be executed simultaneously on a plurality of elements, then all the lines or surfaces that need to be changed by that operation must be indicated one by one. Thus, the modification of the parts of the model and the associated adjustment of the other parts is laborious and time-consuming with the known user-interfaces and frequently leads to errors. This disadvantage is particularly felt if the modifications have to be carried out by means of a CAD system. In the case of the new development of components or the further development of existing parts, for example, it is possible only with very great difficulty to determine any design errors by reference to a single two-dimensional image reproduction. Thus, these errors are not noticed until a physical object has been made using the data stored in the CAD system.

Although, in principle, it is possible to implement programs in a CAD system which trace such errors at an early stage, this too requires considerable programming effort. Also, the computer time is substantially increased so that a rapid dialogue between the computer and the user is prevented.

These difficulties could be obviated with a user-interface wherein the exchange of data between the computer and the user is carried out at a higher abstraction level which takes greater account of the physical structure of the object but nevertheless has a less narrow relationship to the geometric basic elements visible on the screen. However, the disadvantage of these systems is that they are not adequately adapted to the methods of the designer or technical draftsman and therefore, the use of these systems is difficult for the traditionally trained designer to learn.

SUMMARY OF THE INVENTION

Generally, the present invention provides a method of generating and processing models of two-dimensional or three-dimensional objects in a computer and reproducing the models on a display wherein consistent changes to the model can be carried out with a reduced number of commands which are easy to input.

According to the present invention, the computer not only represents the geometric shape of the object but also the physical structure of the object and shows the structure on the display in the form of a tree-like structural diagram wherein each part or element of the object is indicated by means of a specific word. A junction in the tree structure is used to indicate a part or element created or built up of subelements (i.e. basic elements). When the user wishes to perform a specific operation with a part or element of the object such as if he wishes to rotate or move the element or paste the element to another element of the object, he can identify the element, together with the associated subelements required to take part in the operation, in a single inputting step by marking the junction of the tree structure corresponding to that part or element with the pointer. As a result, the quantity of work required by the user in modifying the model is greatly reduced and the risk of individual subelements being forgotten in an operation carried out on a part or element built up of several subelements is precluded. The tree structure provides a clear identification of the required elements even though the display of the geometric shape of the object may represent more than one element by the same line, thereby making the elements indistinguishable.

In the identification of the elements in the tree structure, communication between the user and the computer is not on an image plane but on a symbolic plane. Nevertheless, the user does not have to use a different inputting medium such as a keyboard. The inputting of commands is always by means of the pointer on the display so that the user can keep his attention directed toward the screen and fully concentrate on the objects being viewed.

By simultaneously representing the object and the tree structure on the display, the user can see practically at a glance the geometric shape of the object and also the spatial relationship between the elements of the object which may not be recognizable directly from geometric shape. This greatly facilitates the interpretation of two-dimensional representations of two-dimensional or three-dimensional objects because the physical structure of the object is made clearer and more meaningful to the user through the tree structure.

If the image of the object on the display is created, step by step, from simple geometric elements, the creation of the tree structure is displayed in parallel with this. Thus, the tree structure constitutes at the same time a kind of record of the design process and enables the user to return to earlier stages in the design and to redesign and try out alternative models on the basis of an intermediate stage of the design. This follows the designer's normal procedure wherein he usually draws a model with a few lines and only works out the details of the model at a later stage.

Preferably, the models are created according to the user's instruction by means of geometric operations such as moving, rotating, enlarging, reducing and/or Boolean operations, such as connecting, forming points of intersection, forming points of differentiation, from elements whose shapes are already determined by data stored in or input into the computer. It is also possible for these elements in turn to be constructed from elements of a lower hierarchical level.

The method of the present invention can be adjusted so that the tree structure is only adapted in response to corresponding commands by the user. To ensure that the tree structure is adapted uninterruptedly, the user when inputting each new element can be asked to characterize that element and input it in to the tree structure. It is also feasible for additions to the tree structure to take place automatically by marking the newly input elements by means of continuous numbers or greatly reduced representations or characterizations of the corresponding geometric figures. The new element will then be dealt with in the tree structure as a subelement of an existing element.

When a new element is added simultaneously to a number of existing elements, this can be shown by joining the associated branches of the tree structure so that a closed ring or a mesh is formed in the tree structure. In this case the tree structure shown on the screen can also be so adapted that a new word is input for the whole ring or mesh and all the associated elements are then treated as subelements of equal rank. Theoretically it is also possible for the user to change the hierarchical relationships between the elements by means of commands placed in the structure diagram.

If the pointer is used to mark a specific element in the drawing or in the tree structure, the marked element along with all its associated subelements is preferably shown by changing the color or brightness on the display. In this way the relationship between the elements of the image and their associated words are clearly shown in the tree structure so that the user is informed as to what elements, subelements or groups of elements he is using. It is also possible to omit from the image of the object and/or the tree structure all those elements that are not selected so that the remaining selected elements, subelements or groups of elements can thereby be viewed more accurately, and processed to an enlarged scale.

Preferably, the display shows four windows in the form of a 2×2 matrix. Three of the windows act as image windows to reproduce the front, side and top views of the object, while the fourth window is used to reproduce the tree-like structural diagram. This form of presentation and usage of the display is particularly adapted to the practice of the technical draftsman. It also enables the tree structure to be viewed with great clarity by the user. The display can also contain smaller windows containing a menu with the most used or typical commands and a menu with representations of the basic geometric elements known as icons, such as the square, the pyramid, the sphere and the cylinder. These basic geometric elements can be called up with the pointer to create or construct a model.

The commands for the operations to be carried out on the elements are preferably shown in the form of a "pop-up" menu. In a pop-up menu, the commands appear in a window. By means of the inputting device, such as a mouse, the menu can always be generated at that location on the display where the pointer is situated at any time so that the user's attention can be concentrated there. The type of commands appearing in a pop-up menu is preferably dependent on the instantaneous state of the processing so that only the commands which can be executed at that stage are presented. More particularly, when the pointer is situated in a window of the display reserved for the image reproduction of the model and calls up the menu, the type of commands in the menu differs from the type of commands in the menu which appears when the pointer is situated in a window of the display reserved for the reproduction of the tree-like structural diagram and calls up the menu.

In a preferred embodiment of the present invention, data concerning a number of complete screens which contain text information keyed in via a keyboard, drawings drawn on the display by means of the mouse or pictures of other models, can be stored in the computer. These stored display images are functionally comparable to a note pad and can be displayed additively on the screen by the user. In this way the model can be clarified by means of text information. It is also possible to discuss changes to the model by means of sketches and to compare the model with other models.

In another embodiment of the present invention, facilities are provided to process information from the note pad in the model under treatment. By means of such methods it is possible for elements sketched in the form of sketches on the note pad to be input to the model simply as bodies of rotation or translation.

Other advantages of the present invention will become apparent from the following detailed description and accompanying drawings of a presently preferred embodiment of the best mode of carrying out the invention.

DESCRIPTION OF THE PREFERRED EMBODIMENT

Figure 1:
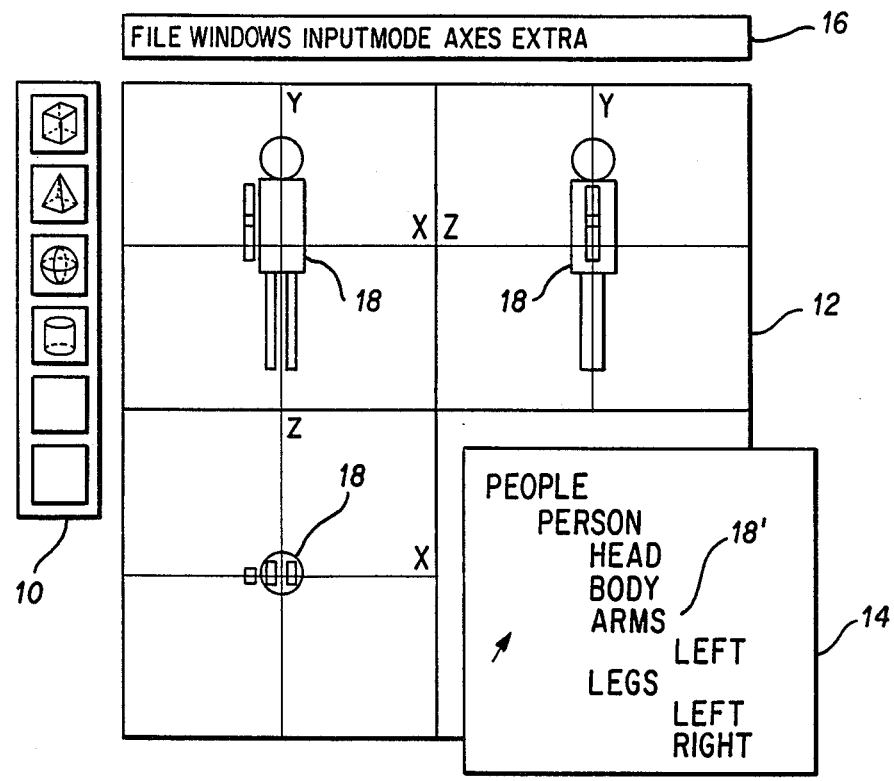
FIGS. 1-4, 5A-5C. 6A-6C. 7A-7C. 8A-8D, 9A-9D and 10A-10B are examples of the information shown on a CAD system display during various stages of the method according to the present invention.

A user-interface utilizing the present invention will be described with reference to FIGS. 1-10.

1. Hardware

The user-interface utilizing the present invention is made on a work station which is preferably designed around a 68010 microprocessor and has a high-resolution color screen (1024 with 800 pixels). Each pixel can contain a color from a palette of a maximum of 16 different colors. The work station is also equipped with a 55 megabyte hard disk. Preferably, a keyboard and a mouse having two buttons are used for inputting information.

2. User-interface 2.1 Menus

Commands are given by making a selection from the menu. Menus ensure that the inexperienced user makes quick progress by clearly showing the commands that can be selected. Menus also have a lower memory loading than, for example, an alphanumeric command language because at all times it is clear from the menu what commands can be given and the commands are presented in a simple, structured manner. Preferably, the mouse can be used for making a selection from the menu so that there is no need to change at any time from the mouse to the keyboard and vice-versa.

The menus are displayed on the screen to ensure visual continuity. The user's attention remains directed to the screen in contrast, for example, to menus printed on a graphic tablet. Various forms of menus are possible. Static menus having a fixed place on the screen are frequently used. These menus remain visible for a fairly long time. "Pull down" menus which are visible only when the user wishes to make a choice therefrom, can also be used. A third type of menu is known as the "pop-up" menu. This menu has no fixed place but can appear at any desired place on the screen, usually near the cursor.

The most important disadvantage in using a continuously visible menu at a fixed place is that the menu occupies a fairly considerable amount of space on the screen or digitizer tablet thereby reducing the clarity of the screen. These disadvantages are obviated by dynamic menus such as the pop-up menu. Dynamic menus also have the advantage of requiring less effort and hand movements for selection by the user since the menu appears close to the cursor which is also the user's point of visual attention. Preferably the menu type used in the present invention is the pop-up menu.

2.2 Mouse

Preferably, the mouse is equipped with two buttons. A small number of buttons such as this facilitates operation. One the one hand, the efficacy of use increases with a larger number of buttons. Two buttons, A and B, are used as a compromise between a more effective use, on the one hand, and a lower risk of errors, on the other hand. With only two buttons, there is a clear functional distinction between them. Button A is used for all "indication" operations such as the selection of a part of the model or the selection of an icon. Button B is always used to show a pop-up menu containing the commands that can be validly executed at that time and at that place.

2.3 Windowing

Information is displayed graphically on a screen. It is important when displaying a model that an overview should be retained. A good solution to this is the use of windows. The screen is divided into graphic windows each having a specific type or group of information. In this way everything can be presented to the user more logically and in a structured fashion. Overlapping of the different windows can be done and gives more space on the screen. With overlapping, there is less need to use a plurality of screens and this has the advantage that the user's attention will be less divided.

3. Commands

A description of the user-interface with respect to the windows and associated commands will be given in the following paragraphs.

3.1 General

The commands that can be given are in many cases not independent orders but have a purposeful effect. In other words, they are associated with an operand. The operand can be specified by the user and typically indicates a part of the model, or it can be implied, in which case the operand is contained in the command. There is also frequent involvement of one or more attributes which are characteristics attributed to the operand. Two examples of commands, operands and attributes are

| command | operand | attribute |
| --- | --- | --- |
| Paint | foot | purple |
| Rotate | cylinder | 5 degrees |

The sequence of command, operand and attribute set forth above is not mandatory or essential. In fact, a different sequence is frequently used in the present invention, for example: select the cylinder; call up the command "rotate"; and then indicate the amount of rotation. However, if a command lacks an operand, in principle it is impossible to execute the command.

3.2 Commands in windows

As shown in FIG. 1, a number of windows appear when the user-interface is activated. These windows are an icon window 10, a design window 12 which contains the graphic representation of the model, a structure window 14 which contains the structural representation of the model and a command window 16.

3.3 Icon window

Icon window 10 is used to select a primitive or "current" object form which can be input into the graphic window. The choice is made by indicating with the mouse cursor and pressing or clicking the button. Feedback of a choice after it has been made is effected by high-lighting the associated icon. Block, Cylinder, Pyramid and Sphere are some of the primitives which can be implemented. The description of the method of inputting the primitives is given in Section 5.

3.4 Design window and Structure window

A model 18 is displayed in design Window 12 and structure window 14. As already stated, two methods of representation are used, one which shows the dimensions and positions of the parts of the model, and one which shows the construction and assembly of these parts. Preferably, design window 12 shows the model using three different views and structure window 14 shows the structural representation. At the bottom right of FIG. 1, the hierarchical construction of model 18 is shown in the form of a tree structure 18' located in structure window 14. Design window 12 and structure window 14 are closely connected and therefore use some of the same commands such as Select, Copy, Cut and Paste.

3.4.1 Select

A part of model 18 can be selected by clicking the "select" or "indication" button (button A) on the mouse. A choice is made by indicating a part of the object in design window 12 or indicating a branch of tree structure 18' in structure window 14 with the mouse. Once a selection has been made, the selected item is indicated by a different brightness or color in both the graphic and the structural representation.

3.4.2 Copy

Figure 2:
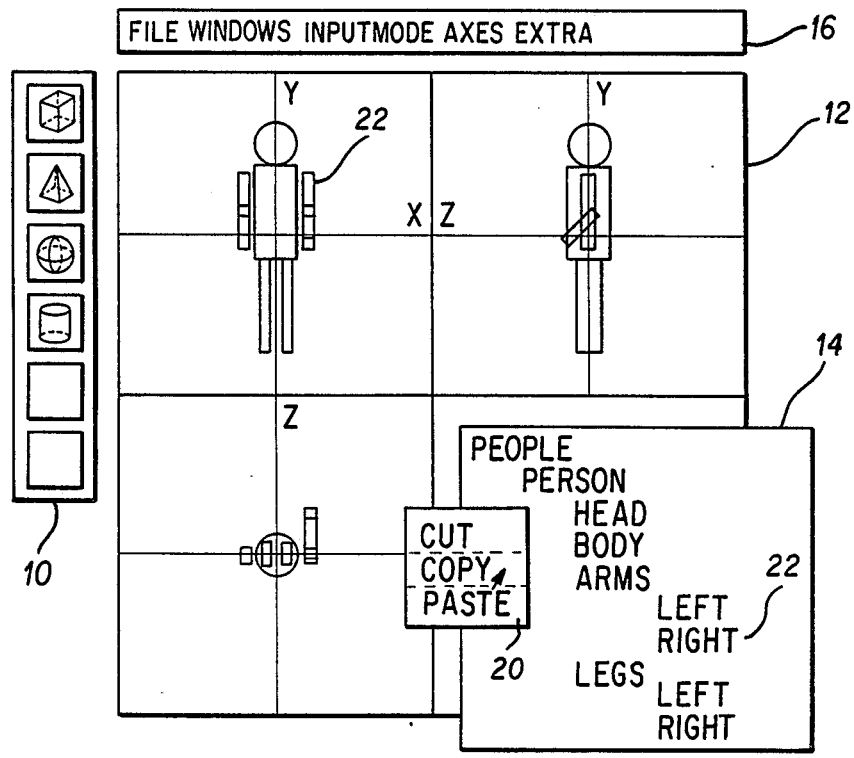

Pressing the menu button on the mouse (Button B) displays a pop-up menu 20, shown in FIG. 2 which contains the commands that are possible for that window at that time. The command copy ensures that the part of the model selected at that time is placed in a buffer. The model itself is not affected. If no selection is made, the announcement "No element selected" appears on the screen. In FIG. 2, the part of the model which has been selected is right arm 22.

3.4.3 Cut

Figure 3:
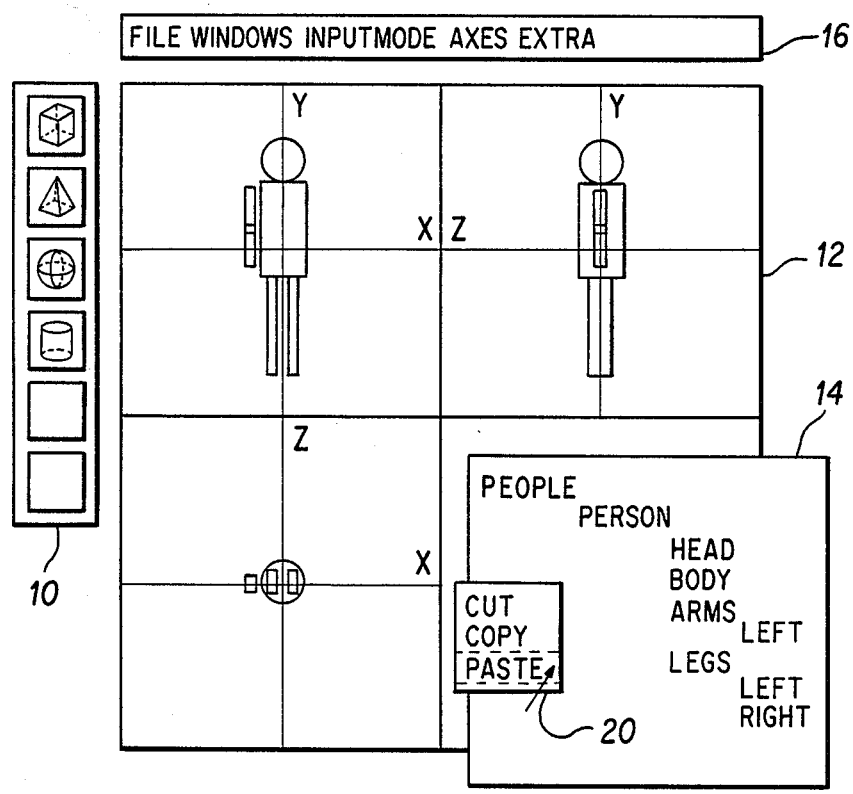

The cut command removes the selected part of the model and places that part in a buffer. The model itself is changed by this command. If nothing is selected, the announcement "No element selected" appears on the screen. FIG. 3 shows the model after the cut command has been used on right arm 22.

3.4.4 Paste

Figure 4:
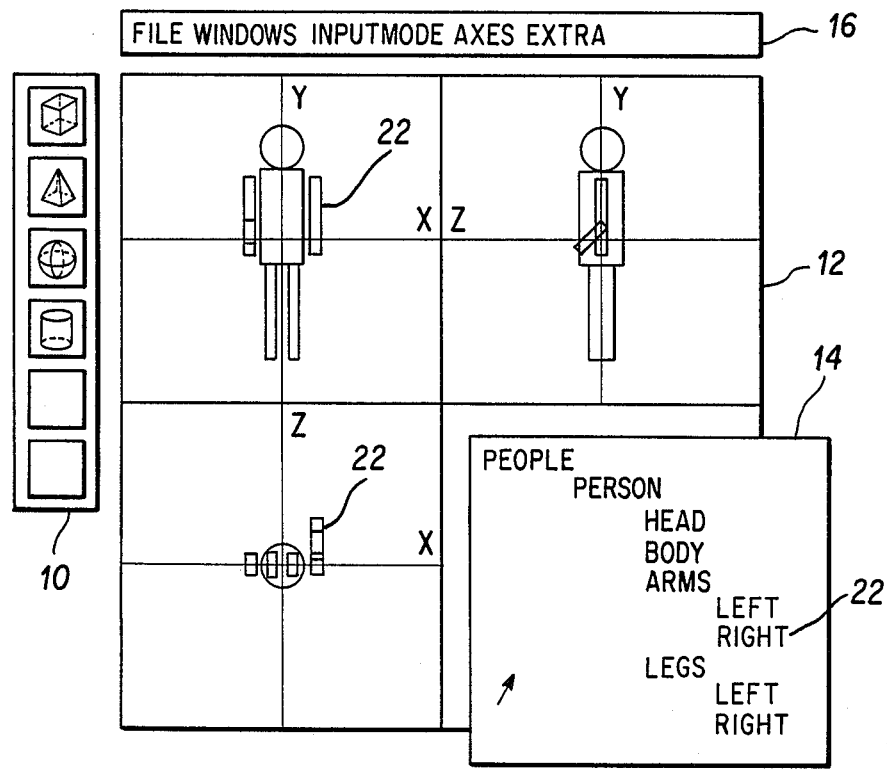

The paste command pastes the part which has been put in the buffer by the copy or cut command to that part of the object selected at that time. Execution of the paste command does not empty the buffer or destroy its contents and therefore it is quite simple to obtain several copies of the same part by pasting it several times. If the buffer is empty when the paste command is used, the announcement "Nothing in paste buffer" appears on the screen. FIG. 4 shows the paste command being used to put right arm 22 on the model of FIG. 3.

3.5 Structure window

The commands which apply only to structure window 14 are: Open/Close; Rename, Insert and Add.

3.5.1. Open/Close

Figure 5A:
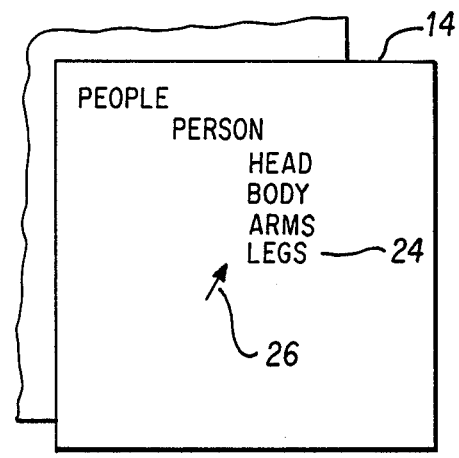
Figure 5B:
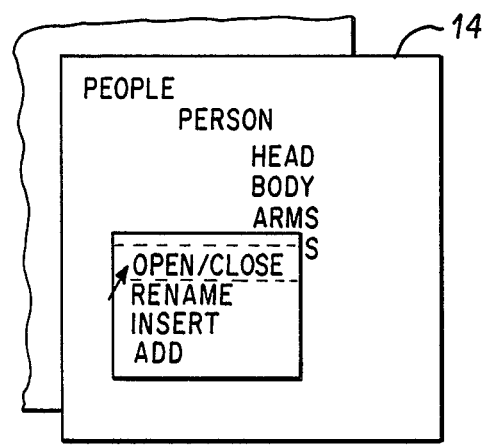
Figure 5C:
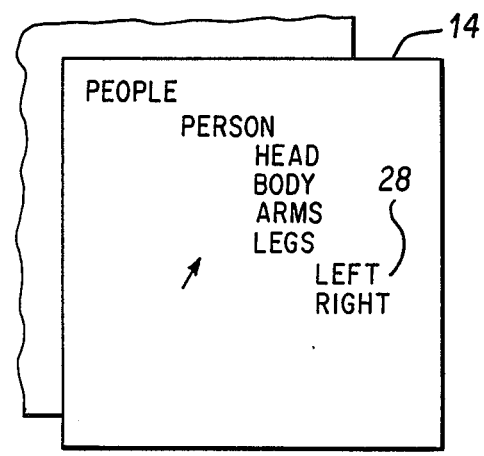

With the open/close command, junction 24 of the structure indicated by cursor 26 is opened if it is closed and closed if it is open. If a junction is open it means that bottom branch 28 is displayed in structure window 14. If a junction is closed, it means that no bottom branch is displayed in structure window 14. FIG. 5 shows the steps by which junction 24, representing the legs of the model, is opened to include and display the subparts left and right.

Frequently, the user is concerned with or interested in only a restricted part of a model such as only a single branch thereof. In such case,, only a restricted part of the model is shown since depicting the entire tree structure would be confusing. Additionally, an entirely open tree structure, in most cases, will not fit within structure window 14.

3.5.2 Rename

Figure 6A:
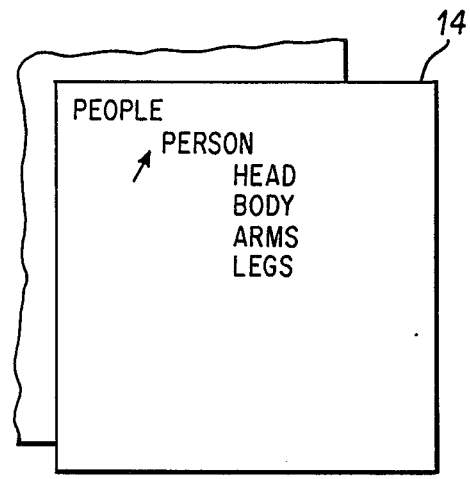
Figure 6B:
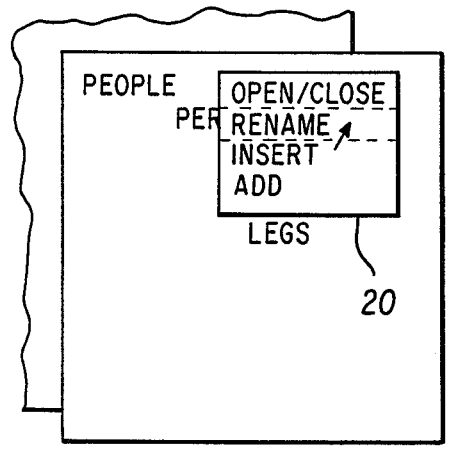
Figure 6C:
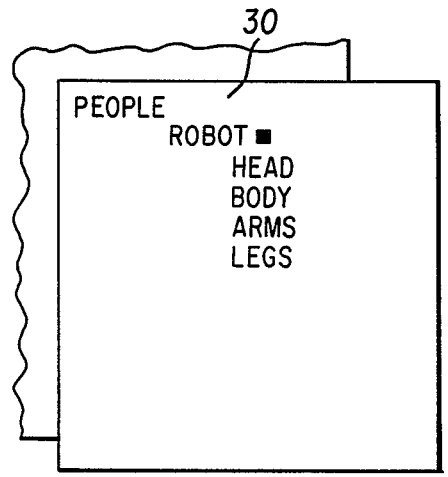

A structure representation with a nameless junction tells the user almost as little as no representation at all. The user must have a command by which he can carry out logical naming. The rename command is that command. By indicating a junction with cursor 26 and selecting the rename command in pop-up menu 20, it is possible not only to type in a new name 30 but also to change an old name. FIG. 6 shows the use of the rename command to change the name of the junction at person to robot.

3.5.3 Insert

Figure 7A:
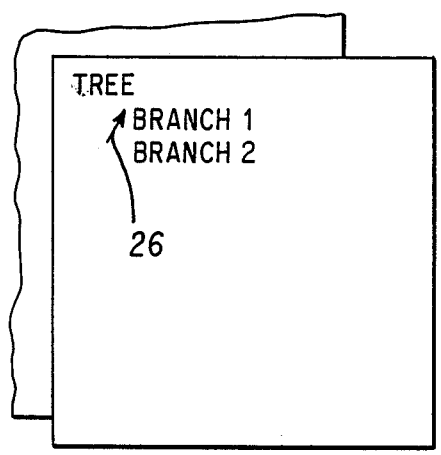
Figure 7B:
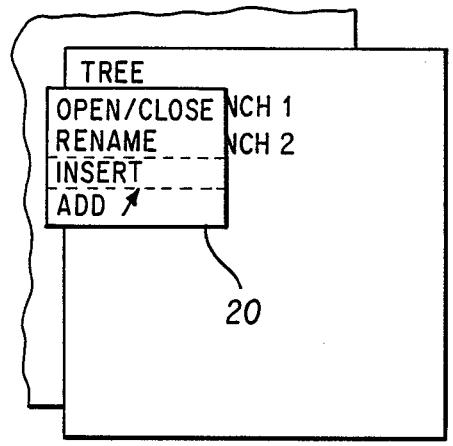
Figure 7C:
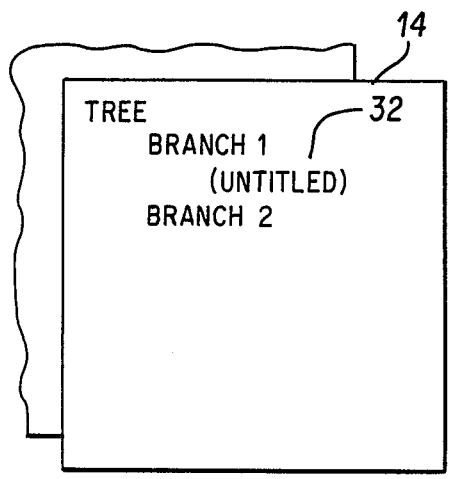
Figure 8A:
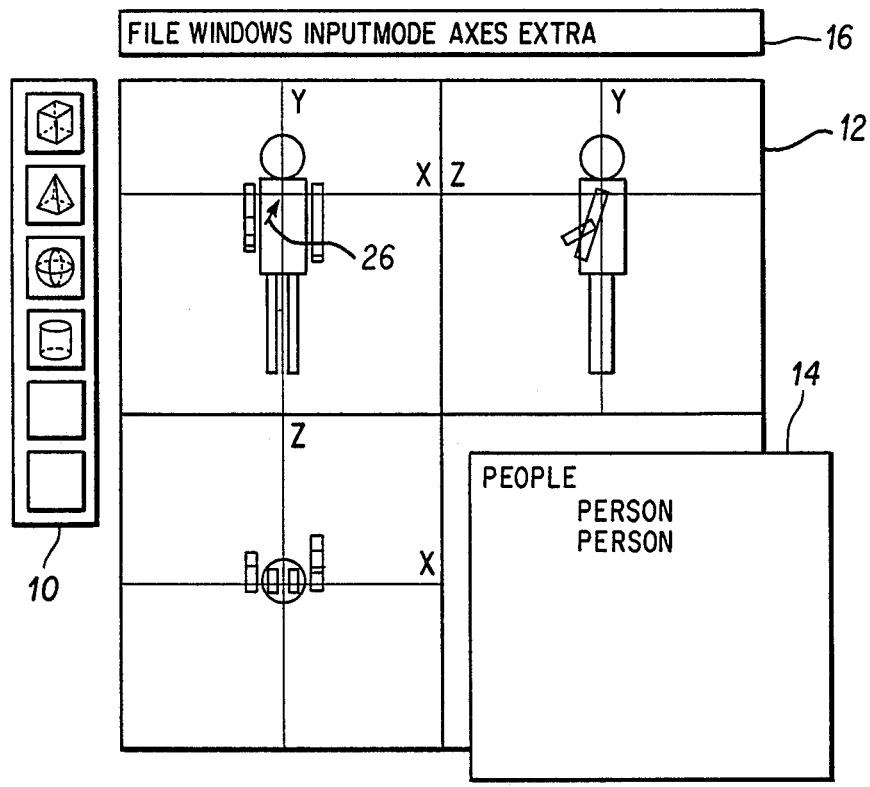
Figure 8B:
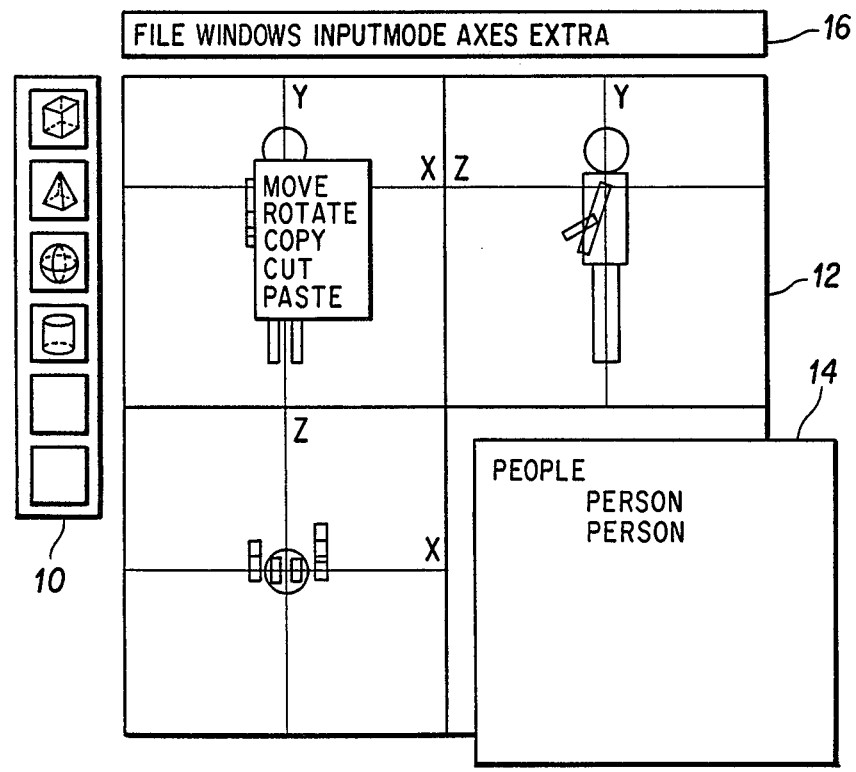
Figure 8C:
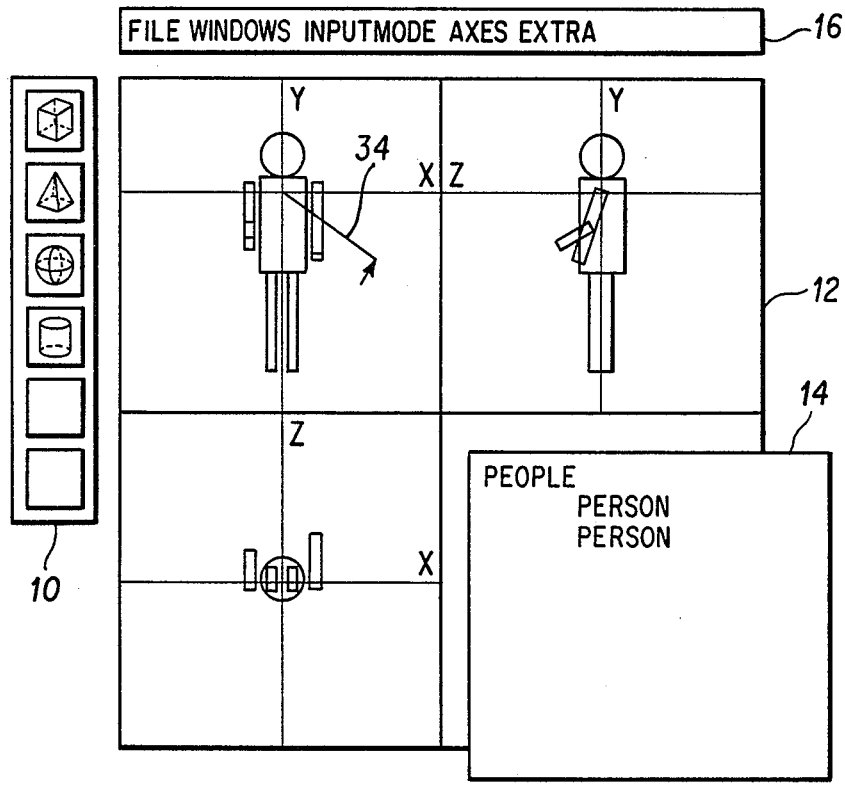
Figure 8D:
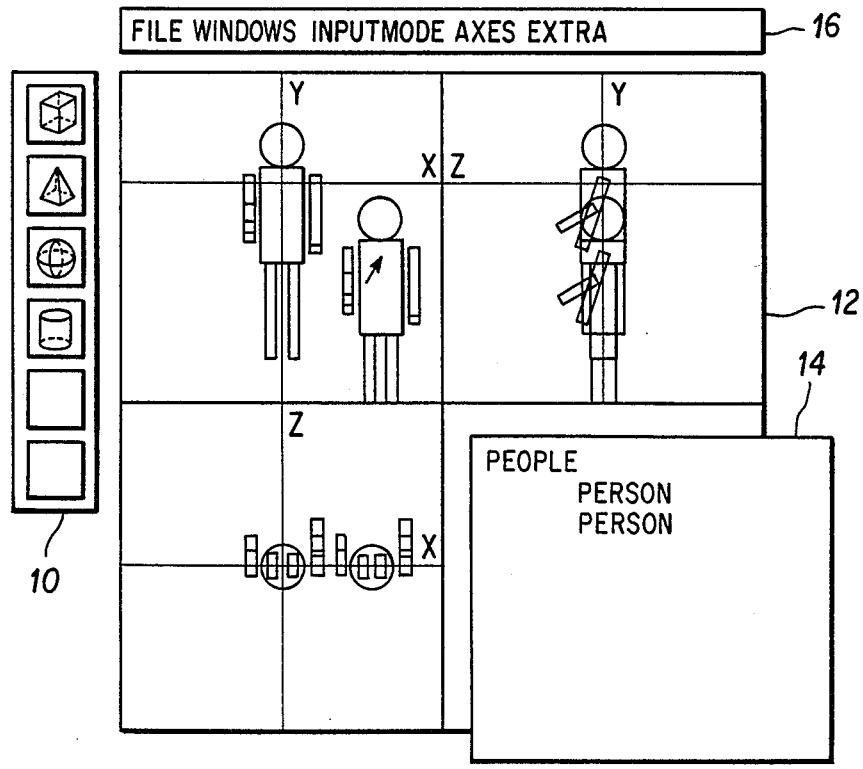
Figure 9A:
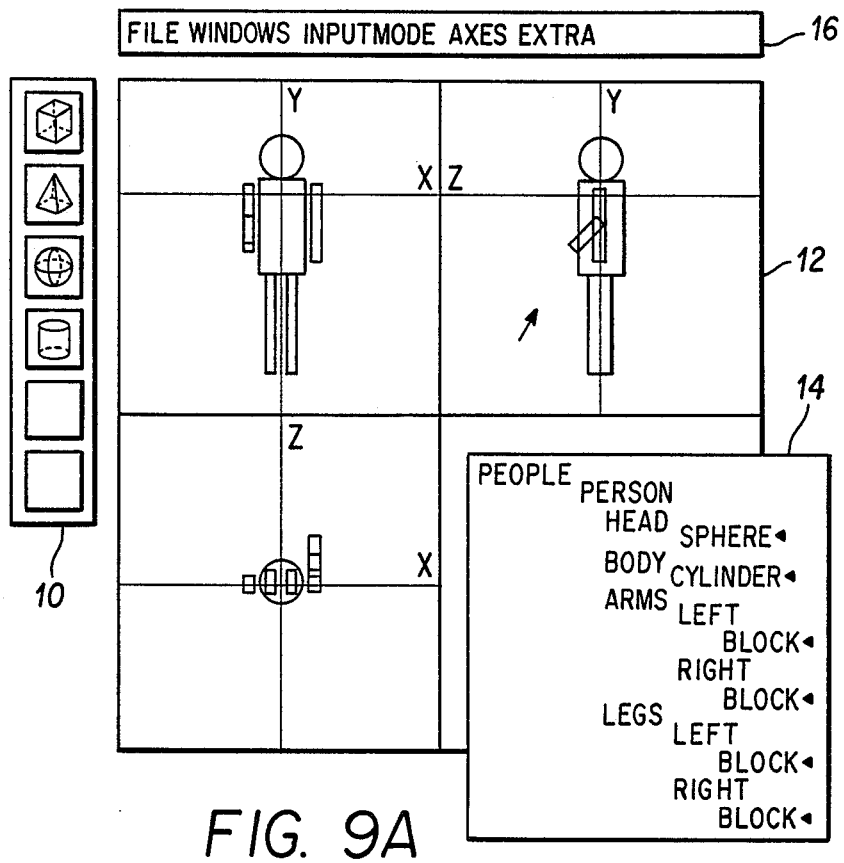
Figure 9B:
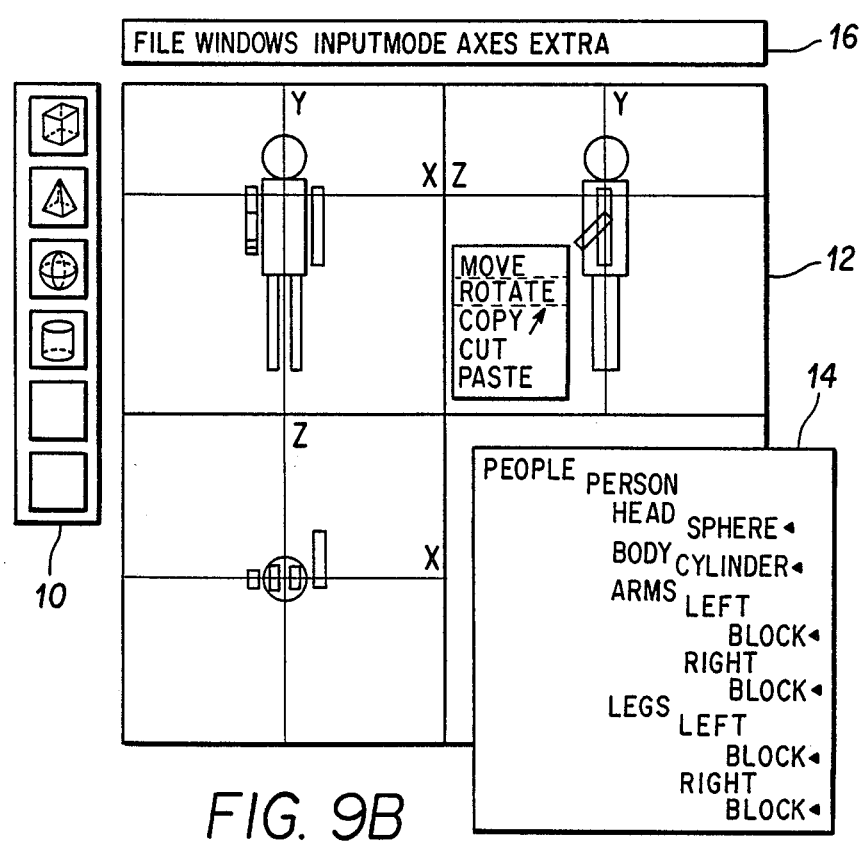
Figure 9C:
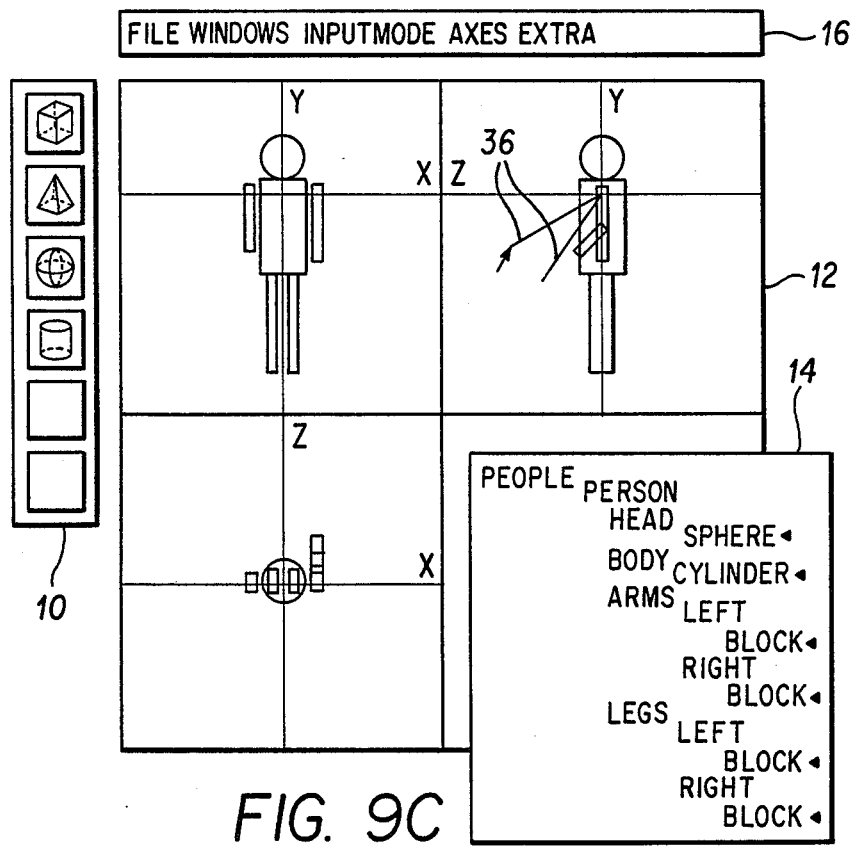
Figure 9D:
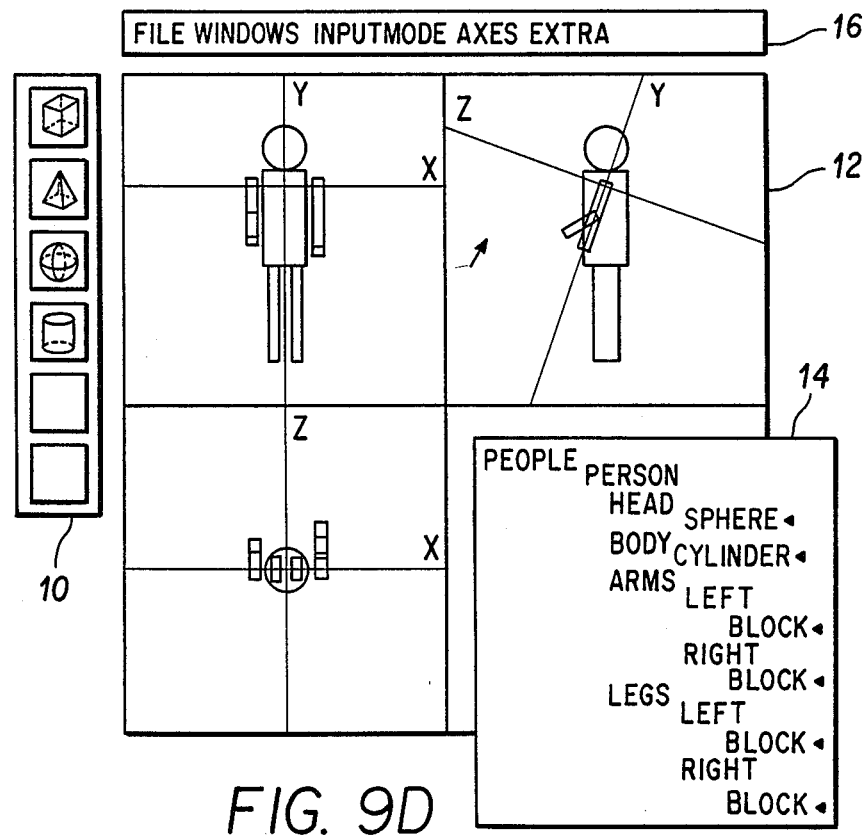

To be able to expand a structure it must be possible to create new junctions. This can be done by the insert command or the add command. The Insert command ensures that a new and hence empty junction 32 forms on a hierarchical level lower than the junction that was indicated by cursor 26 when the order was given. The default name of the new junction is "[untitled]". A logical name can be given to the new junction with the rename command. FIG. 7 shows the operation and effect of the insert command.

3.5.4 Add

The add command is comparable to the insert command described above but instead of the new junction appearing on a lower hierarchical level, the new junction appears on the same hierarchical level. Again, the default name is "[untitled]" and can be given a logical name by the rename command.

3.6 Design window

The commands which apply only to design window 12 are move and rotate.

3.6.1 Move

The selected part of model 18 can be moved by the move command as shown by the sequence of steps depicted in FIG. 8. The move can take place in any desired view. A line 34 can be shifted in any view, from the position where cursor 26 was when the move command was selected (see upper left hand diagram of FIG. 8) along a maximum of two axes to the current position of cursor 26 (see lower left hand diagram of FIG. 8). What the move command really does is not so much to shift the objects which come under the selected junction, but to define a new origin for the junction. This origin is graphically represented by the crossed axes. Since all the objects which fall under the junction are defined with respect thereto, this has the same effect as moving a branch in structure window 14. It is also possible to engage the entire object and move it over the screen. This process is called dragging.

3.6.2. Rotate

The rotate command is analogous to the move command. FIG. 9 shows the operation and effect of the rotate command. Instead of moving the origin, the orientation of the coordinate axes is changed. This has the same effect as rotating the selected object. When it is impossible to rotate the entire object in real time with cursor 26, a number of rubber bands or lines 36 are used to indicate the beginning point and end point of the rotation. Rotation is possible about one axis per view, that axis being the axis perpendicular to the screen.

3.7 Command window

Command window 16 is used to select from a number of menus containing commands which have a more global character. See FIG. 1. The commands in command window 16 are grouped into various categories and are explained in the following paragraphs.

3.7.1 File menu

The commands in the file menu are Save, Load, New and Exit. The save command writes out the model under the file name. The load command reads the model from a storage disk. The new command erases the model from memory. The system asks for confirmation before this is done. The exit program command leaves the program and the user-interface. The system asks for confirmation before this is done.

3.7.2 Notepad menu

The user-interface supports a notepad function which can be called up by selecting notepad in command window 16. As soon as the user has called on this function, the cursor changes into a representation of a very tiny pencil as a sign that a transparent notepad sheet has been placed over design window 12. On this transparent notepad sheet, the user can either draw, by moving the mouse and pressing button A, or type, by positioning the cursor and inputting text by the keyboard.

The advantages of having the notepad function on the screen are that the information on the notepad is always present in the system, the user's attention remains directed to the screen, and the notepad can be assigned many other extra functions apart from that indicated. The commands contained in the notepad menu are Erase on/off, Next page, Previous page and Clear page. The Erase on/off command toggles the system between the erase mode and the draw mode. The cursor alternates between a pencil and an eraser. The next page command causes one to go to the next page of the notepad. The previous page command causes one to go to the previous page of the notepad. The clear page command erases the visible page from the notepad. The system asks for confirmation before the clear page command is executed.

3.7.3 Input mode menu

The input mode menu shows the theoretical extension of the inputting of other basic elements than the primitives. In the embodiment described herein, only the inputting of primitives is implemented in the user-interface. Extension to sweep-generated shapes can be relatively easily integrated into the user-interface. After "Sweep" has been selected in the input-mode menu, it is possible, for example, to replace the present icon menu by another menu with specific "sweep" icons in it, with which it would be possible to create other shapes in design window 12.

3.7.4 Axes menu

The axes menu contains a number of extra commands related to the axis systems of the model. The commands in the pop-up menu designated for this are the move command and the rotate command. These commands influence the origin and orientation, respectively, of the system of axes of a selected junction.

Figure 10A:
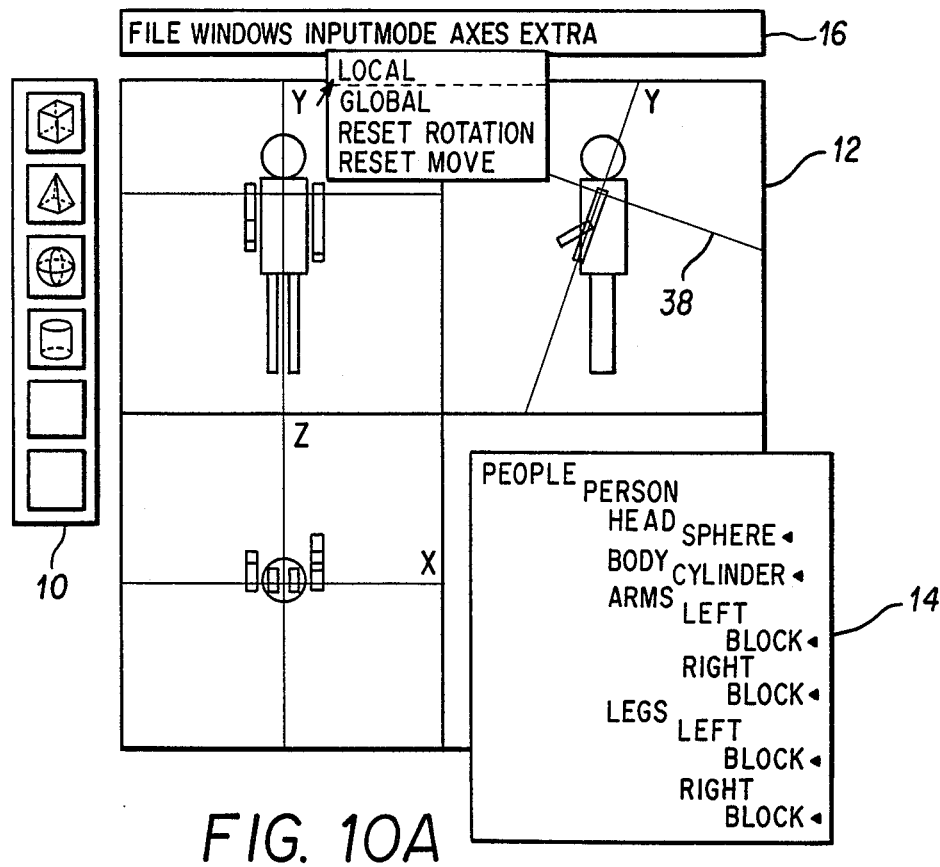
Figure 10B:
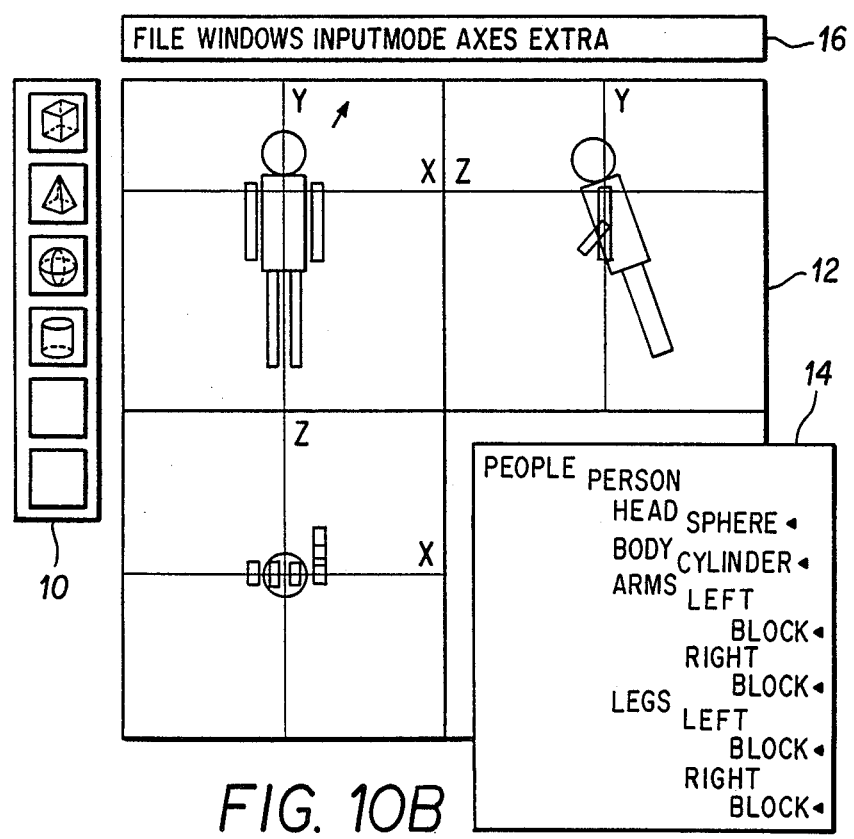

The axes menu contains the commands Local, Global, Reset rotation and Reset move. As shown in FIG. 10, local command causes the graphic representation to be depicted with the system of axes 38 of the selected junction as a world coordinate system. The global command causes the graphic representation to be depicted with respect to the original default world coordinate system. The reset rotation command causes the orientation of the system to be reset to that originally chosen, (i.e. identical to the orientation of the world coordinate system). The reset move command causes the origin of the system to be reset to that originally chosen, i.e. identical to the origin of the world coordinate system.

3.7.5 Extra menu

Commands which facilitate working with the user-interface are implemented in the extra menu. These commands are Zoom reset, Enlarge, Reduce, Snap on/off, and Grid on/off. The zoom reset command displays the model at the default zoom setting. The enlarge command zooms in on the model, increasing its size. The reduce command zooms out away from the model, decreasing its size. The snap on/off command switches the snap function on or off. Snap ensures that cursor 26 jumps to the closest position when identifying positions. The grid on/off command creates a preference in cursor 26 for positions lying on an adjustable grid. This command is comparable to Snap on/ off.

4. Announcements

At various places during the functioning of the system, an announcement is given to the user. A distinction is made between announcements which require an answer by the user and announcements which are given solely for the user's information. An example of an announcement requiring an answer is the reading in of a file. The response to this is the announcement "Enter file name to load." After this announcement, the user can type in a suitable name. An example of an announcement given solely for the user's information is an error announcement such as "Nothing selected".

Announcements, preferably, occur in a separate small window. An announcement may have a movable or a fixed position on the screen. Announcements requiring an answer appear at a fixed position on the screen since they are the result of a purposeful action by the user and he therefore has knowledge of the position where the announcement appears. Error announcements appear at a nonfixed position such as near the cursor. An error announcement is generally a result of a faulty action by the user who, accordingly, does not expect any announcement. In the latter case, if the announcement were to appear at a fixed position, it might easily be overlooked. A remedy frequently used to overcome this is for the announcement to be accompanied by a penetrating acoustic signal such as a "bleep". Placing the error announcement near the cursor, the most obvious point of attention for the user, however, renders the disturbing noise unnecessary.

The system, by itself, cannot determine when an announcement is read by the user. This particularly applies to announcements which do not require an answer. One possibility would be to show the announcement on the screen for a given period of time such as 5 seconds. However, it would be more reliable to let the user give a confirmation so that there is no risk of an announcement going unnoticed. Confirmation, typically, is provided by pressing mouse button B. In the case of an error announcement, a pop-up menu appears on the screen containing the phrase "Okay". The user must acknowledge the error announcement to have the pop-up menus disappear. In the case of an announcement in which an answer is to be given a pop-up menu having the choices of "Okay" and "Cancel" appears. The cancel command ensures that the action which caused the announcement is discontinued.

5. Inputting of primitives

The inputting of the four primitive forms is implemented in the user-interface. The forms are Block, Cylinder, Pyramid and Sphere. All of these forms are input in a corresponding manner. The inputting process takes place in a number of stages as follows:

1. Select the primitive by clicking the associated icon in icon window 10 at the left hand of the screen.
2. By means of cursor 26 which changes from an arrow to a cross during the inputting process, a position is indicated in one of the three views and button A is pressed.
3. A rubber band or line now appears from the selected primitive between the position chosen in the second step and the cursor position. The shape of the rubber band depends on which primitive is input. The following are the pairings of the primitive with its corresponding rubber band: Block: rectangle; Cylinder: circle, Sphere: circle, Pyramid: rectangle. This step is completed by pressing button A again. The shape is then determined in the one view chosen. That is, the shape is established with respect to two coordinate axes. The coordinate axes concerned, of course, depend on the view selected.
4. To determine the third coordinate axis, a change has to be made to one of the other two views. In this view, a third position is indicated by cursor 26 and button A pressed. Of this position, only the relevant coordinate is taken over i.e. the one that was lacking in the first view.
5. The lacking view now appears between the position selected in step four and the cursor position. The action is completed by again pressing button A. Thus, the position and dimension of the primitive are completely determined and become a definite part of the model.

Since the risk of faults and errors increases as the number of steps required for implementing an action increases, the user has an "Undo" command at each step which is activated by pressing button B. A pop-up menu then appears containing the command "Undo". When this command is selected, the program undoes the last step or goes back one step. By selecting "Undo" several times in succession it is possible to go back step by step to the first step of the inputting procedure. If "Undo" is then implemented, again the program leaves the input mode and the cursor changes back to an arrow from a cross.

As stated above in the description of step 3, the shapes of the primitives during inputting ave different characteristic views. For example, all the views of Block have the shape of a rectangle while Cylinder has a circle and two rectangles as its views. A fixed inputting sequence is used for the various primitives. For Block and Sphere this sequence is not so important since they generate the same shape type for each view. For Cylinder and Pyramid, however, the conditions are different. Initially, the basic plane is input. For Cylinder this is a circle and for Pyramid this is a rectangle. Then, only one shape type remains to be input for the second view. For Cylinder this is a rectangle and for Pyramid this is a triangle. If, for example, a rectangle were drawn as the first view of Cylinder, the user would then have to indicate whether it is a rectangle or a circle for the second view to be determined, and this therefore would mean an extra step in the inputting procedure.

6. Example

To give an idea of the operation of the user-interface of the present invention, a session will now be described in which a design example is manipulated. The example is short and superficial and intended only to give an overall idea of how the user-interface looks and functions. The example is shown in FIGS. 11 through 26.

Figure 11:
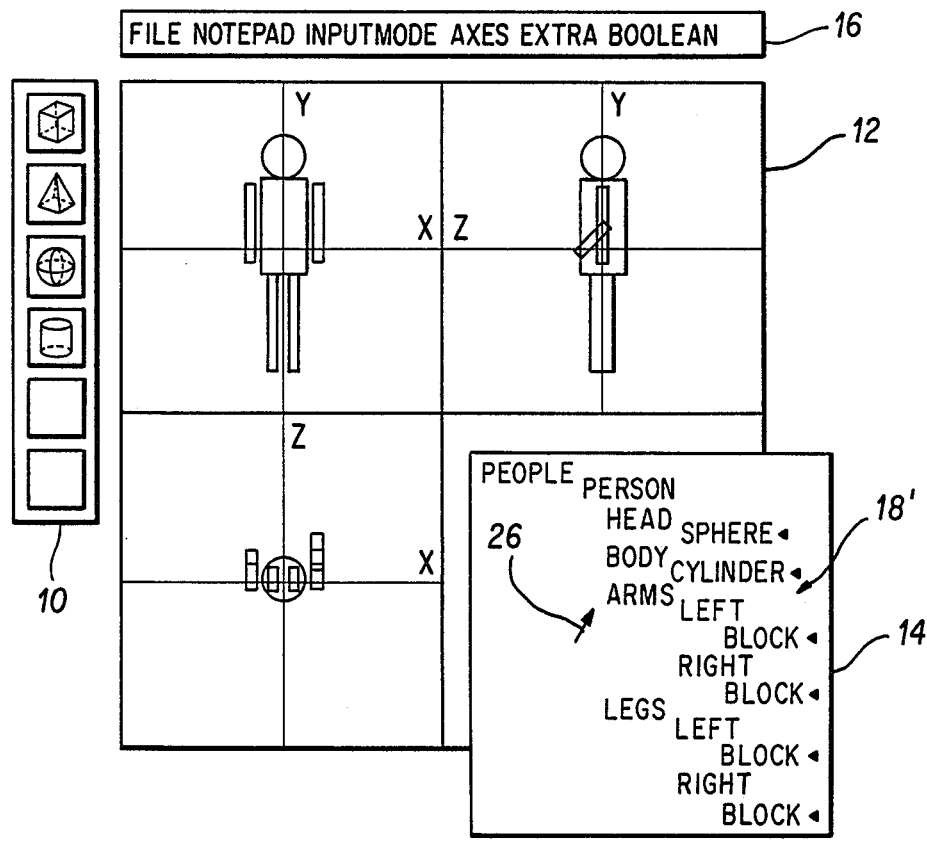
FIGS. 11 to 26 show the progression of the information appearing on a CAD system display during a specific application of the method according to the present invention.
Figure 12:
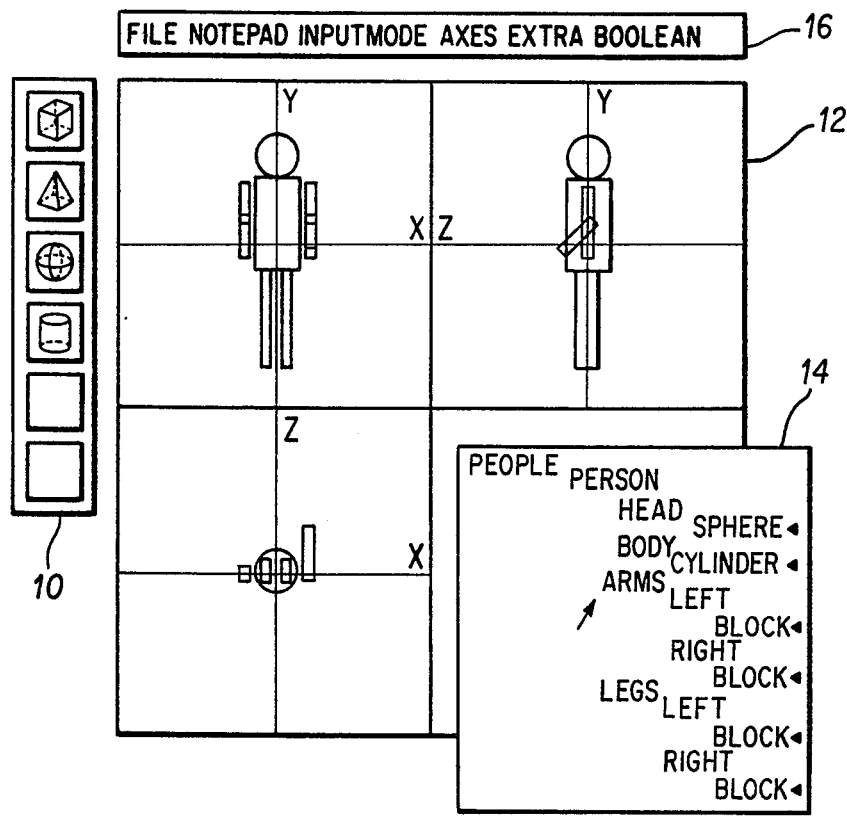
Figure 13:
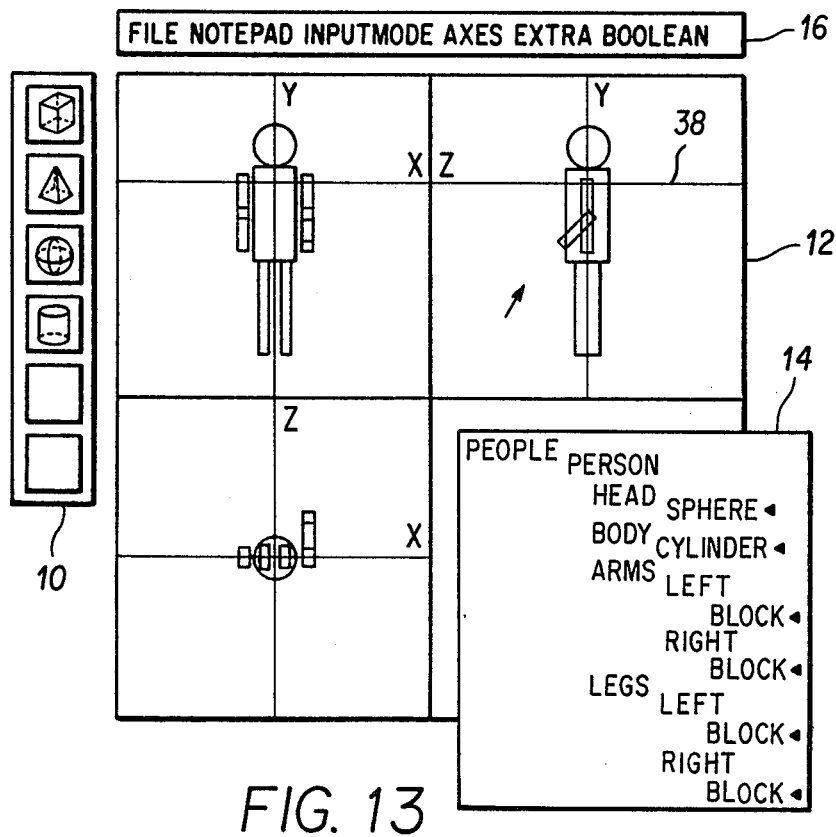

As shown in FIG. 11 at the bottom right, the hierarchical construction of model 18 is shown in the form of a tree structure 18' in structure window 14. In this structural representation, the branch Arms is indicated by cursor 26 and then selected by pressing mouse button A. To show that the selection has taken place, the branch Arms and everything else falling thereunder is highlighted in the structural representation as shown in FIG. 12 by the darker lines. The same applies to the arms that are shown in the graphic representation in design window 12.

Figure 14:
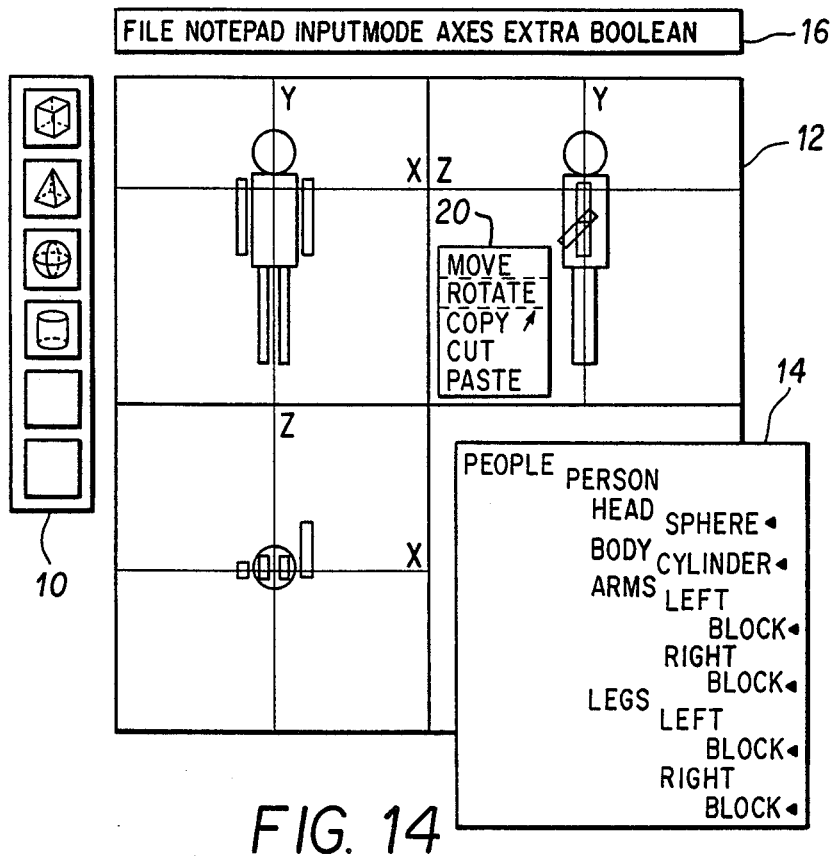
Figure 15:
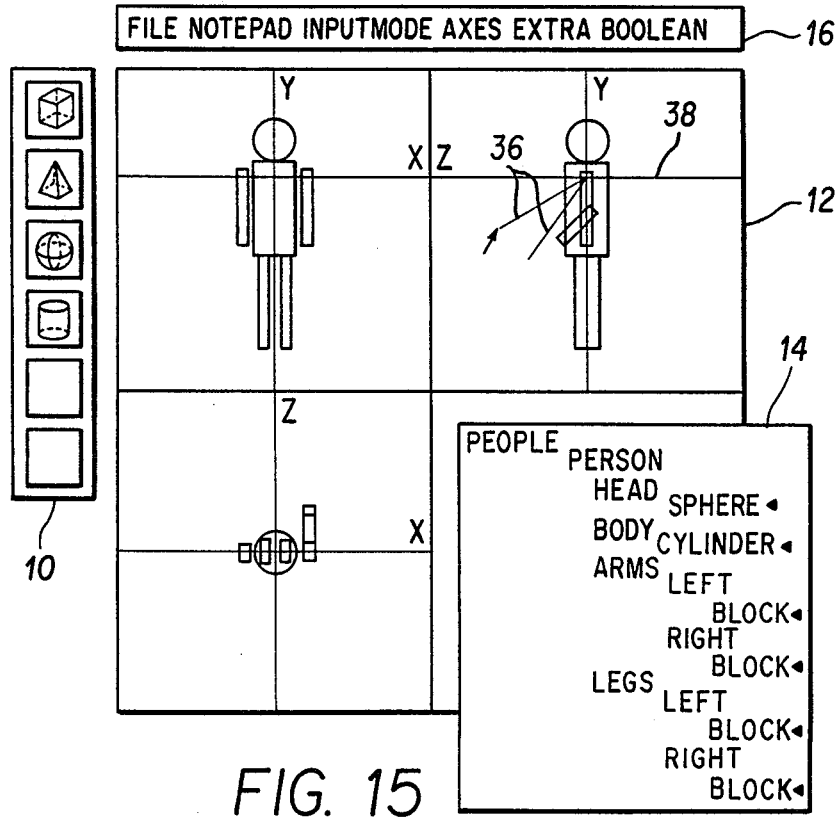
Figure 16:
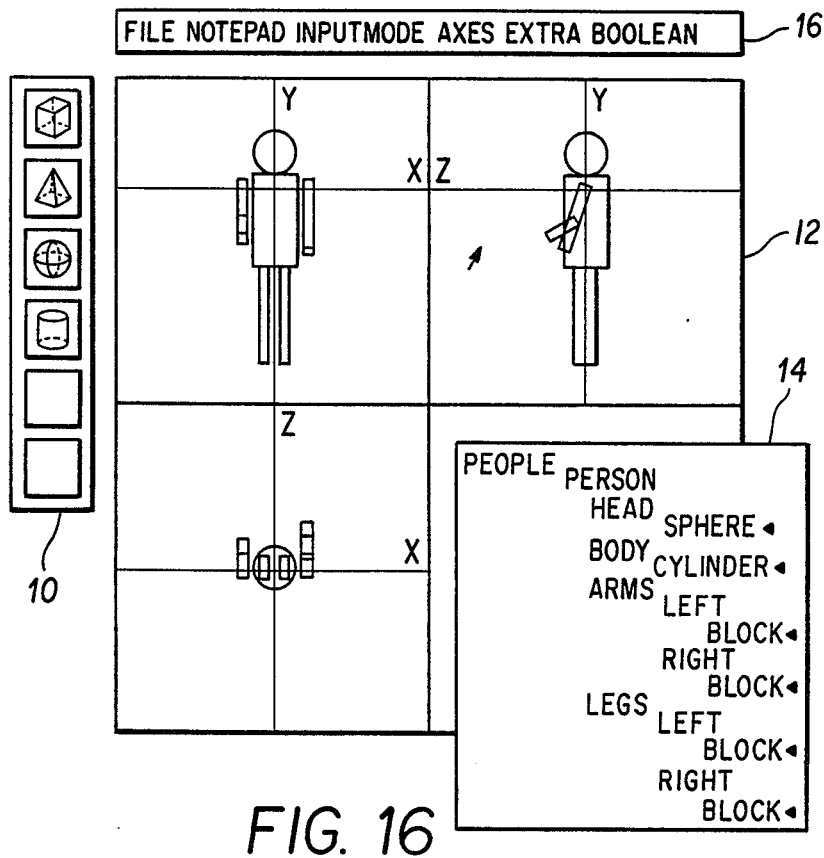

The decision is then made to rotate the arms about the x-axis. This is done in the view at the top right in FIG. 13. The rotation is about the center point of axes system 38. By pressing mouse button B, a pop-up menu 20 appears as shown in FIG. 14 from which the rotate command is selected. Two rubber bands or lines 36 appear from the center point of axes system 38, one towards the point where the rotate command was given and one towards the present cursor position as shown in FIG. 15. The angle formed by these two lines indicates the magnitude of the rotation. The rotate command is terminated by again pressing mouse button B. After termination of the rotate command, the rotation is added to the selected part of the model (i.e., the arms) and the whole model is redrawn as shown in FIG. 16.

Figure 17:
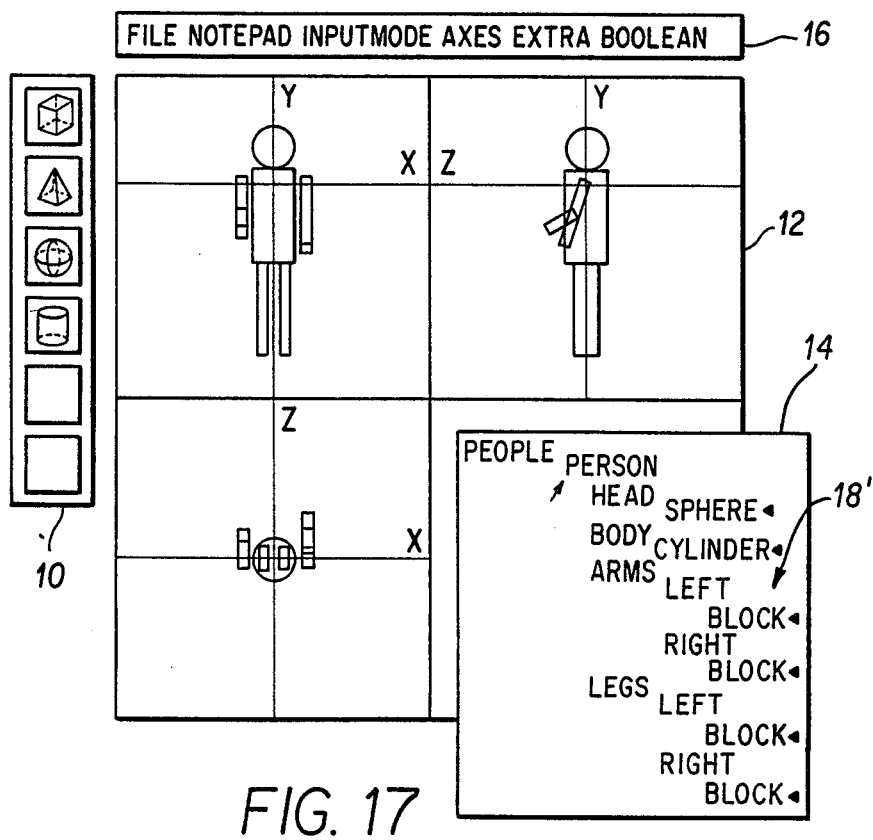
Figure 18:
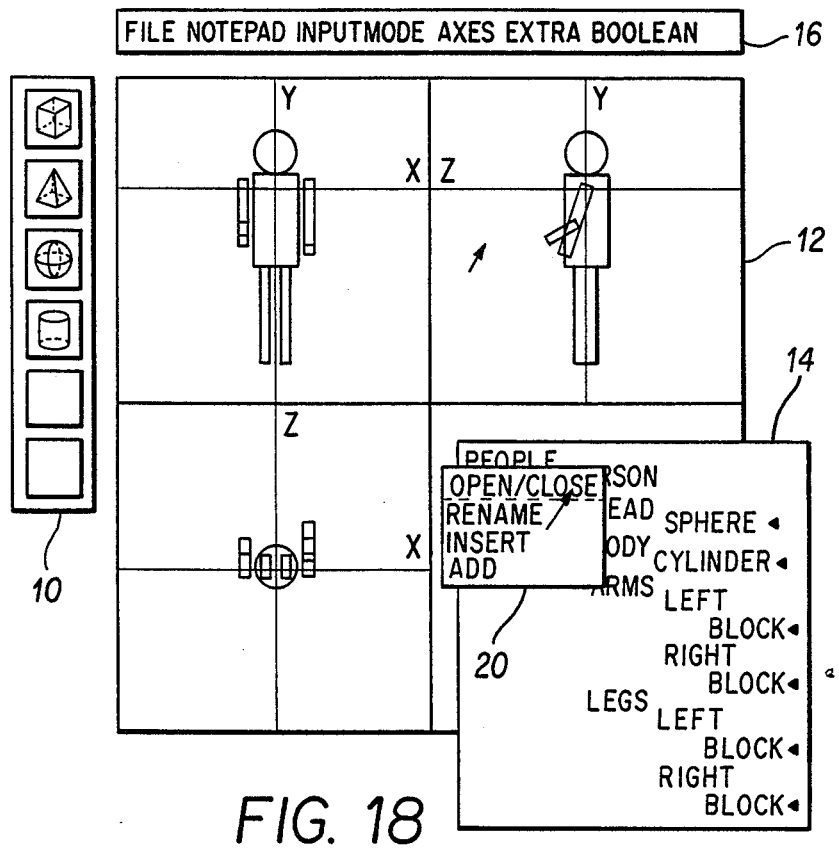
Figure 19:
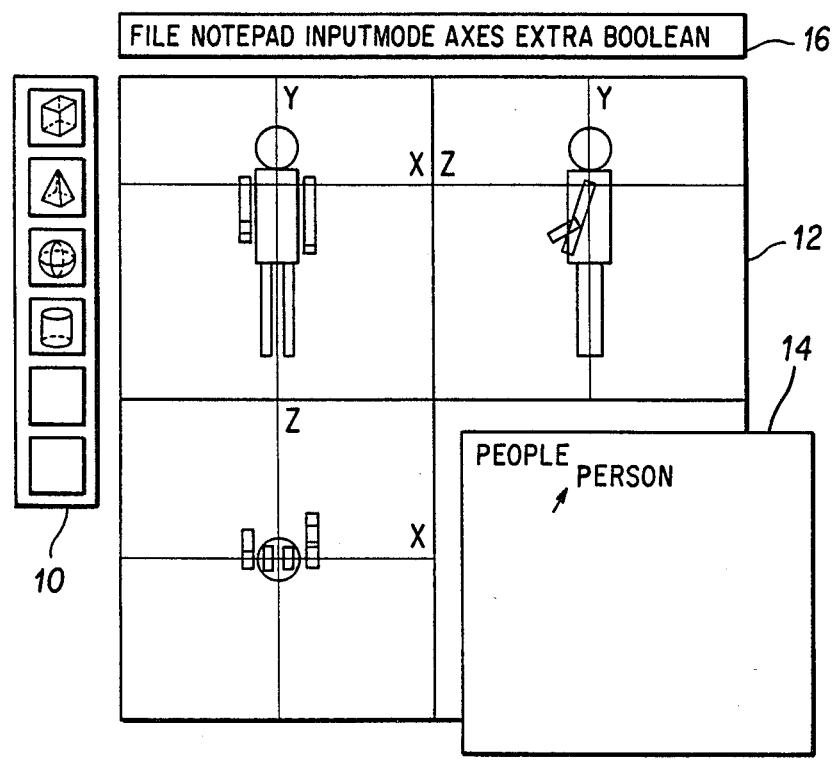
Figure 20:
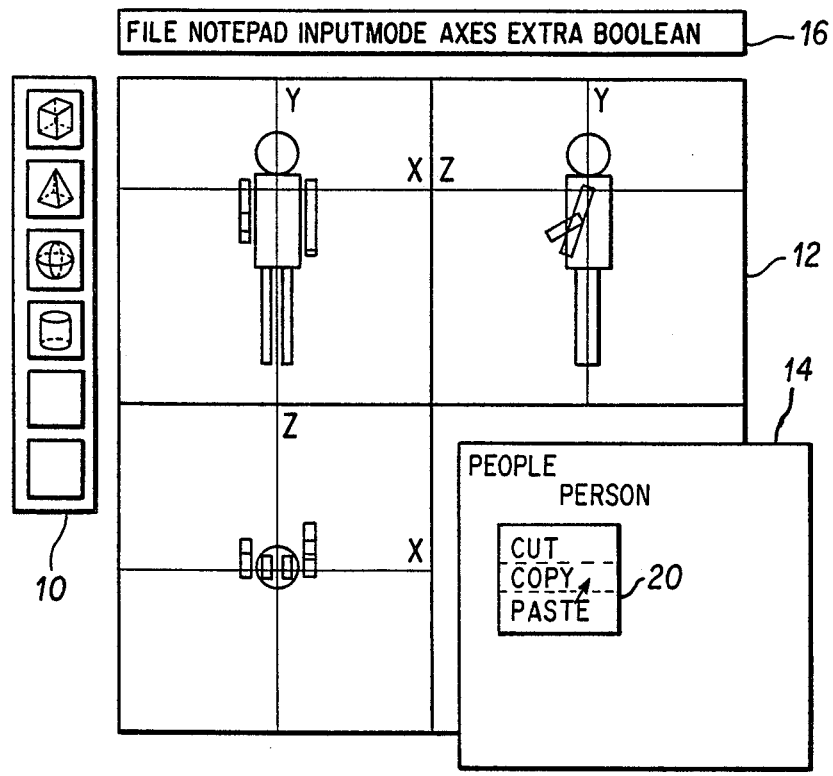
Figure 21:
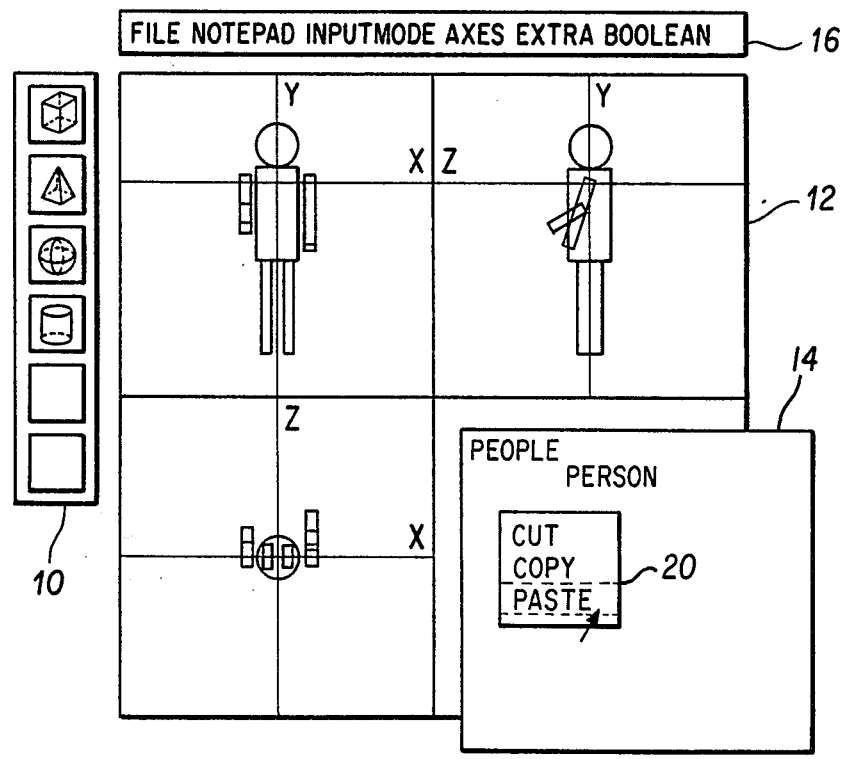
Figure 22:
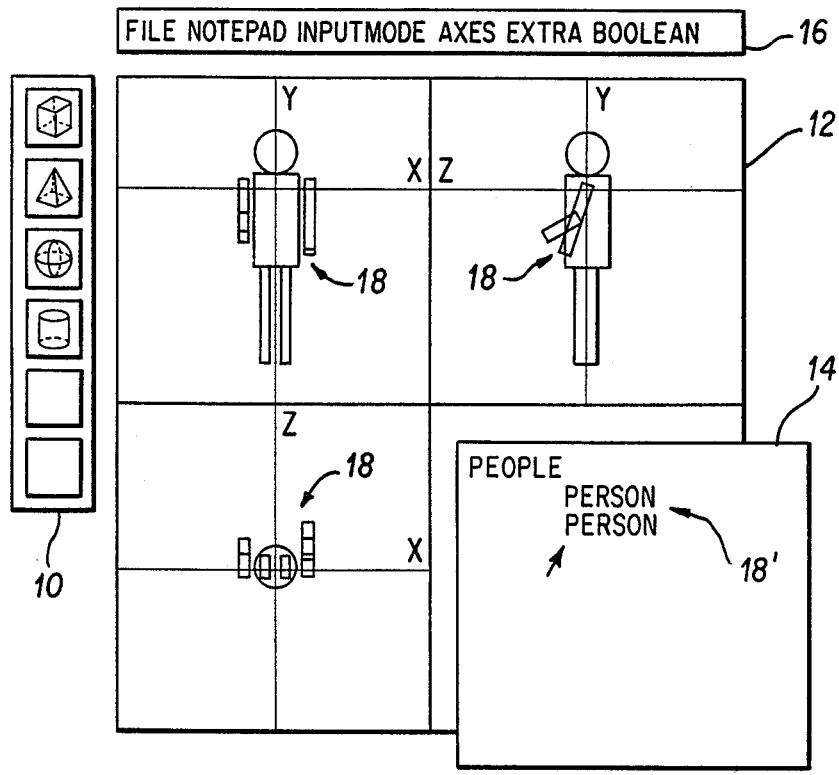

The cursor is then brought to the structural representation or tree structure 18'. The branch with the name "People/Person" is indicated as shown in FIG. 17. The open/close command is then selected. This means that everything under Person becomes invisible if it was visible, or visible if it was invisible. The model is otherwise not affected. The open/close command affects only the representation of the model in structure window 14 as shown in FIGS. 18 and 19. Person is selected with button A as indicated by the highlighting shown in FIG. 19. In FIG. 20, the copy command is then selected. This means that the part of the model that was selected, in this case People/Person is copied to a buffer. By choosing the paste command in FIG. 21, the copy just made is pasted to the selected element. There are now, therefore, two junctions with the name Person under People as shown in FIG. 22. However, only one person is shown in graphic representation of FIG. 22 since the copy is in the same place as the original. A movement of the second person, therefore, must be carried out.

Figure 23:
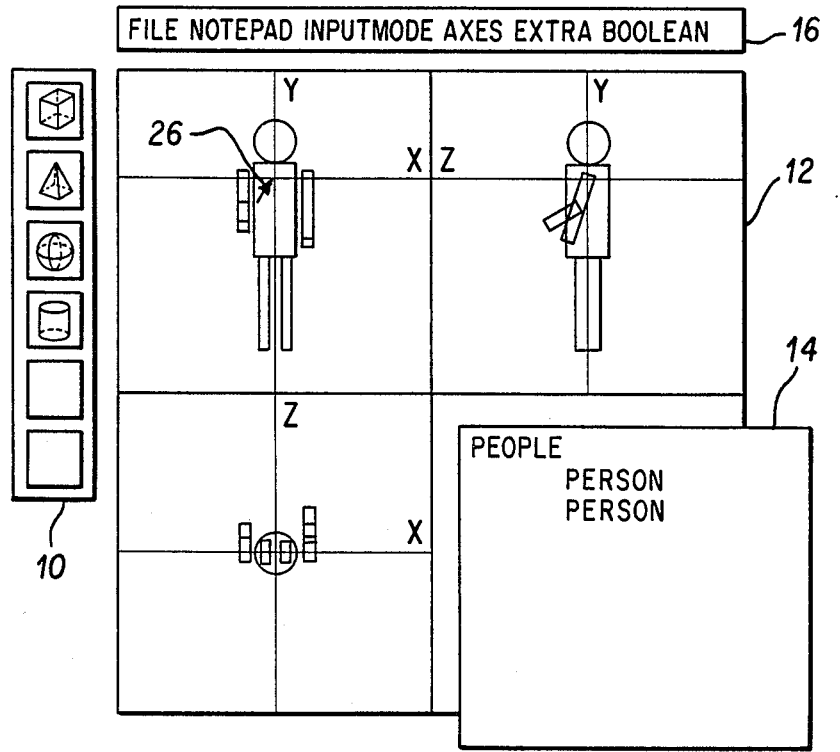
Figure 24:
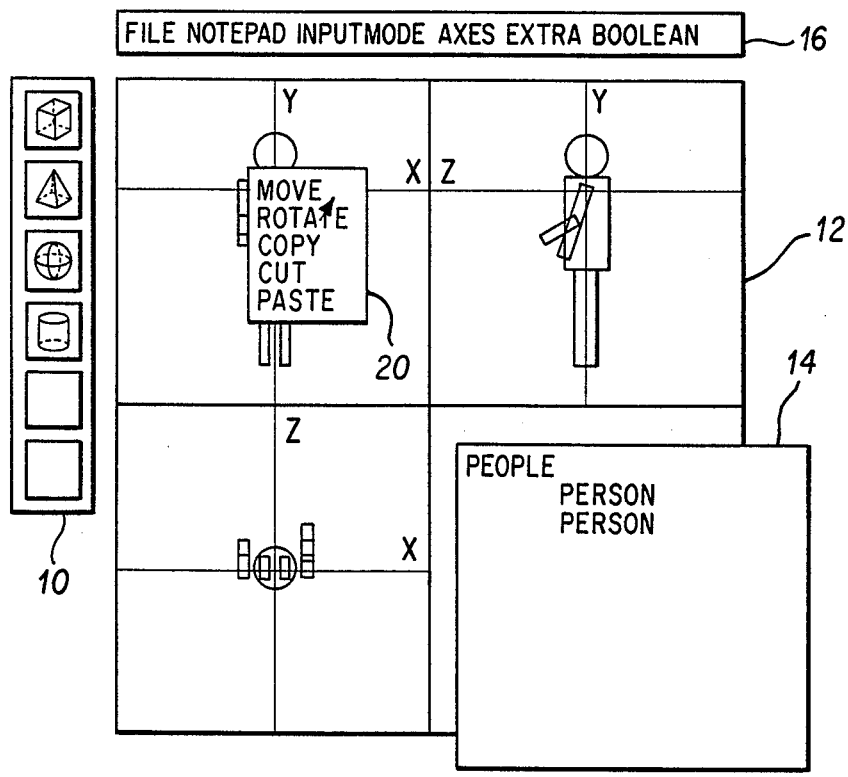
Figure 25:
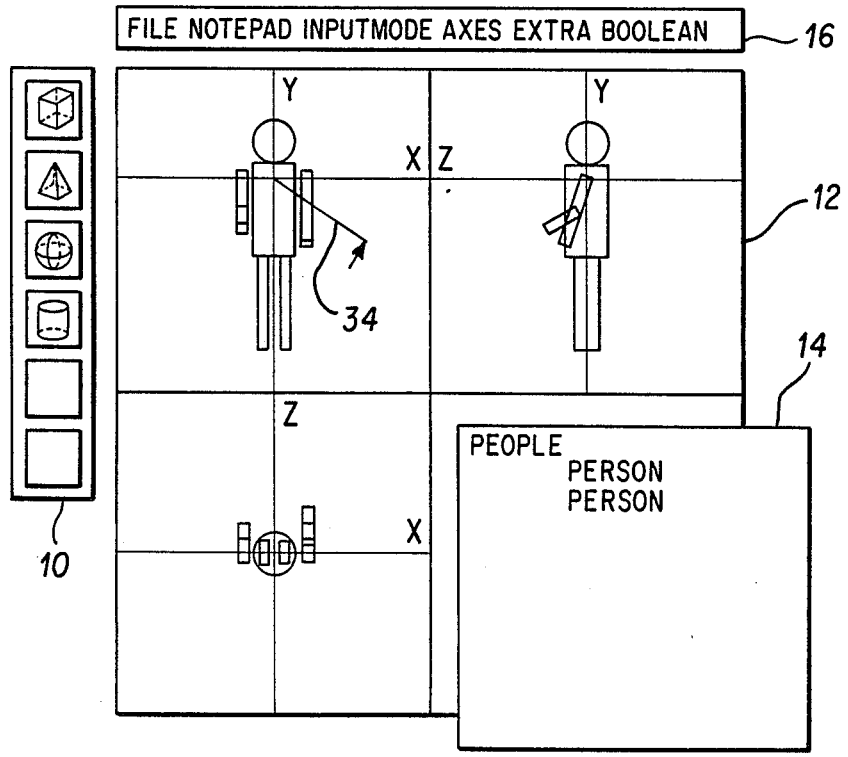
Figure 26:
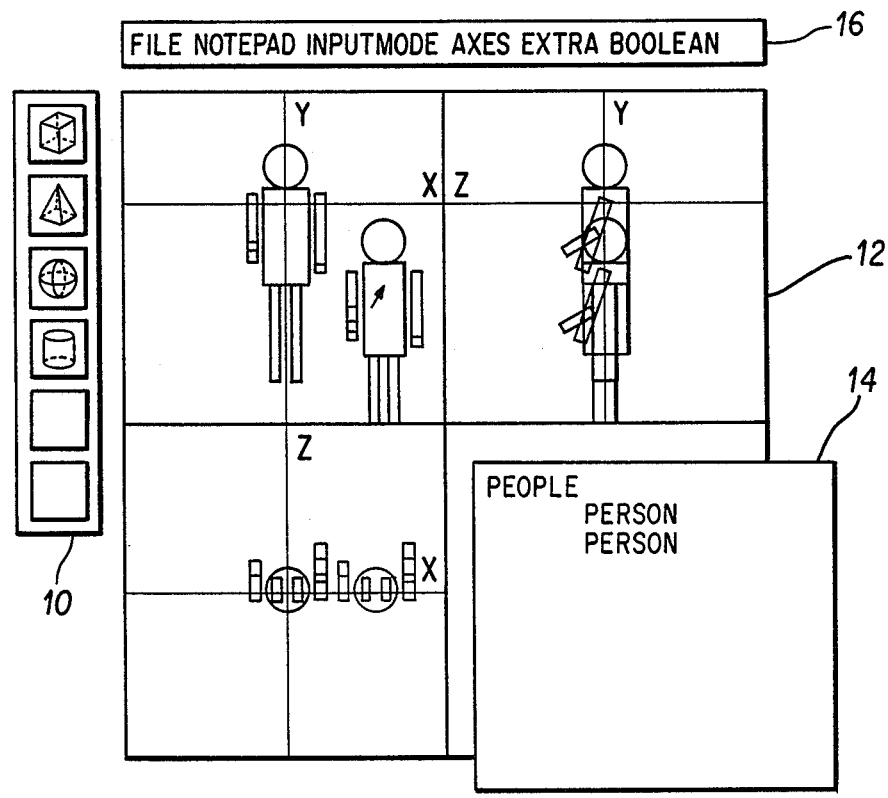

To move the second person, a point is indicated in the top left view, in this case, the origin of the system of axes as shown in FIG. 23. In this view, a movement is possible in the x or y direction by selecting the move command from pop-up menu 20 as shown in FIG. 24. A "rubber band" or line 34 appears as shown in FIG. 25 which indicates where the previously indicated point is to go if the move command is terminated at that instant. Termination is effected by pressing mouse button A. The selected part of the model, in this case the second person, now obtains the appointed place and the model is redrawn as shown in FIG. 26.

The present invention is not restricted or limited to the above-described presently preferred embodiment. With the teachings disclosed herein, one skilled in the art can make numerous modifications to the present invention which are embodied within the scope of the following claims.

What is claimed is:

1. A method of generating, processing and reproducing models of objects on a display by creating a model of the object from a plurality of elements using geometric operations and Boolean operations in accordance with a user's instructions, the elements of the model being constructed from a plurality of basic elements of a lower hierarchical level whose shapes are already determined, comprising the steps of: (a) generating a graphic representation of the model on the display using the plurality of basic elements; (b) using a plurality of menus containing commands and a pointer whose position is user controllable by means of an inputting device, wherein both the menus and the pointer can be shown on the display; (c) selecting specific basic elements, specific elements of the model or specific commands in a menu by marking the appropriate place on the display with the pointer; (d) storing for each element in the graphic representation of the model a word and data concerning the hierarchical relationship between that element and any hierarchically higher and lower elements; (e) generating a structure diagram on the display wherein an element is indicated by its stored word at a place corresponding to the hierarchical level to which it belongs; (f) inputting an operation instruction so that the operation is carried out on the selected element or basic element and on any associated lower-level elements and basic elements; and (g) generating a new graphic representation of the model and a new structure diagram after the operation is carried out.

2. A method as described in claim 1 wherein the element in the graphic representation of the model or in the structure diagram which is marked with the pointer is reproduced in an optically conspicuous manner as are any hierarchically lower elements and basic elements associated therewith.

3. A method as described in claim 1 wherein after the marking of an element in the structure diagram or the graphic representation of the model and after the inputting of an operation instruction, the method further comprises the step of removing all the lower-level elements associated with the marked element from the structure diagram without removing the associated lower-level elements from the graphic representation of the model.

4. A method as described in claim 1 wherein after an element has been marked in the graphic representation of the model or in the structure diagram, the method further comprises the step of displaying one of the plurality of menus on the display at the place where the pointer is situated which contains a given choice of instructions.

5. A method as described in claim 4, wherein the type of instructions in the menu which appears when the pointer is situated in a window of the display showing the graphic representation of the model differs from the type of instructions in the menu which appears when the pointer is situated in a window of the display showing the structure diagram.

6. A method as described in claim 1 wherein the display comprises four windows in the form of a 2×2 matrix and wherein the graphic representation of the front, side and top views of the model is generated in three of the windows while the structure diagram is generated in the fourth window.

7. A method as described in claim 6 wherein the display comprises another window containing diagramatic reproductions of the plurality of basic elements and the method further comprises the steps of marking a basic element with the pointer and transferring the basic element to one or more of the windows containing the graphic representation of the model.

8. A method as described in claim 7, further comprising the step of inputting into the structure diagram the word associated with the basic element which was transferred to the graphic representation such that the word is associated with the higher level element of the model undergoing processing.

9. A method as described in claim 1 wherein information concerning a number of complete models is stored in a computer and can be displayed additively on the display at the user's option.

* * * * *